United States Patent
Thong et al.

(10) Patent No.: US 10,212,677 B1
(45) Date of Patent: Feb. 19, 2019

(54) SYSTEMS AND METHODS FOR SYNCHRONIZATION TARGET SELECTION IN WIRELESS NETWORKS

(71) Applicant: Hong Kong Applied Science and Technology Research Institute Co., Ltd., Shatin (HK)

(72) Inventors: Wilson Wang Kit Thong, Tsuen Wan (HK); Elaine Jihui Zhang, Shatin (HK); Victor Man Wai Kwan, Shatin (HK); Vincent Zizhou Wang, Shatin (HK); Eric Kong Chau Tsang, Kowloon (HK); Wei Han, Shatin (HK)

(73) Assignee: Hong Kong Applied Science and Technology Research Institute Co., Ltd., Shatin (HK)

( * ) Notice: Subject to any disclaimer, the term of this patent is extended or adjusted under 35 U.S.C. 154(b) by 0 days.

(21) Appl. No.: 15/673,105

(22) Filed: Aug. 9, 2017

(51) Int. Cl.
 *H04W 56/00* (2009.01)

(52) U.S. Cl.
 CPC ........ *H04W 56/001* (2013.01); *H04W 56/003* (2013.01)

(58) Field of Classification Search
 CPC .................................................. H04W 56/001
 See application file for complete search history.

(56) References Cited

U.S. PATENT DOCUMENTS

| | | | | |
|---|---|---|---|---|
| 2016/0044618 A1* | 2/2016 | Sheng | ................ | H04W 56/002 370/329 |
| 2016/0157196 A1* | 6/2016 | Xia | ..................... | H04W 56/001 370/336 |
| 2016/0219610 A1* | 7/2016 | Centonza | ............ | H04W 56/001 |

* cited by examiner

*Primary Examiner* — Ayanah S George
(74) *Attorney, Agent, or Firm* — Norton Rose Fulbright US LLP

(57) ABSTRACT

The present disclosure relates to methods and systems for selection of synchronization targets. Embodiments of the present disclosure provide for selecting a synchronization target for a network device, within operational network constraints, when the network device loses its current synchronization target. When a network device loses its current synchronization target, the stratum index of the network device is downgraded to an artificial stratum index before a selection of a new synchronization target is made. The artificial stratum index is broadcast to children network devices. Downgrading the stratum index to an artificial stratum index allows for selection of available synchronization target network devices with stratum indices higher than or equal to the network device's stratum index. After selection of a new synchronization target, the network device's stratum index is updated, and the new updated stratum index of the network device is broadcast to the children network devices of the network device.

20 Claims, 9 Drawing Sheets

SYSTEMS AND METHODS FOR SYNCHRONIZATION TARGET SELECTION IN WIRELESS NETWORKS

TECHNICAL FIELD

The present invention relates to wireless communication technology, and more particularly to selection of synchronization target network devices in a wireless network.

BACKGROUND OF THE INVENTION

The use of digital data communication has become widespread to the point of nearly being ubiquitous. For example, digital communications are routinely implemented in providing data communications in various systems, such as computer network systems (including personal area networks (PANs), local area networks (LANs), metropolitan area networks (MANs), wide area networks (WANs), the Internet, etc.) and communication network systems (including the public switched telephone network (PSTN), cellular networks, cable transmission systems, etc.).

A network may operate in synchronous mode (e.g., time-division duplexing (TDD) mode), in which transmissions by different network devices (e.g., base stations, access points, user equipment, mobile devices, etc., performing wireless communications utilizing various forms of receivers, transmitters, and/or transceivers) within the network are aligned in time and/or frequency. In such a synchronous network, synchronization of the network devices is of utmost importance because if a network device is not accurately synchronized to the rest of the network (e.g., synchronized to other network devices), its transmissions will not be aligned with the transmission of the other network devices. This misalignment may result in network degradation, as the misaligned network device may cause, when transmitting, interference to other network devices. Also, the misaligned network device may be subjected to interference when other network devices are transmitting. In $4^{th}$ Generation (4G)/long term evolution (LTE) wireless communication system, for example, the 3GPP TS36.133 standard requires that synchronization of network devices of a TDD network must be within 3 us.

Synchronizing the network devices may be accomplished by providing the network devices with synchronization signals, which the network devices can use for performing the synchronization. The synchronization signals may be provided to the network devices from a common synchronization source (hereinafter referred to as "global synchronization source"). The global positioning system (GPS) provides timing reference signals that may be utilized as a global synchronization source by network devices having a GPS receiver.

In some network deployments, a particular network device may not be able to receive, or reliably receive, synchronization signals from the global synchronization source. For example, GPS reference signals, as may be utilized as global synchronization source synchronization signals, are often only reliably received when a device is provided with a relatively unobstructed view of the sky (e.g., disposed outdoors, in an area free of shadowing from terrain, foliage, and structures, etc.). Accordingly, network devices disposed indoors, in an area shadowed by tall buildings or terrain, etc., may be unable to reliably receive GPS reference signals for establishing synchronization with other network devices. A network device that is unable to reliably receive synchronization signals from a global synchronization source may, nevertheless, be within communications range of other network devices, wherein one or more such network devices may be capable of receiving synchronization signals from the global synchronization source. The network devices that are able to receive, or reliably receive, synchronization signals from the global synchronization source may thus broadcast synchronization signals for use by the network devices that are unable to reliably receive the synchronization signals from the global synchronization source. Accordingly, the network devices that are unable to reliably receive synchronization signals from the global synchronization source are able to nevertheless synchronize their communications to the other network devices by using a synchronization signal broadcast by another network device (the particular network device broadcasting the synchronization signal selected/used by another network device being referred to herein as a "synchronization target" and a "parent network device" for the network device receiving the broadcast synchronization signal and the network device using the broadcast synchronization signal being referred to herein as a "child network device").

The same approach can be used for any number of network devices that cannot reliably receive synchronization signals from the global synchronization source but are within communications range of other network devices that are able to reliably receive synchronization signals from the global synchronization source. Moreover, network devices reliably receiving broadcast synchronization signals from a parent network device, and thus establishing network synchronization, may themselves broadcast, or rebroadcast, synchronization signals such that other network devices that are within communications range of these network devices are able to receive synchronization signals. In this case, the network devices receiving these broadcast synchronization signals can use those network devices broadcasting synchronization signals as synchronization targets and the network devices broadcasting the synchronization signals themselves are parent network devices to the network devices receiving the broadcast synchronization. Although various network devices are not receiving the synchronization signals directly from the global synchronization source, all of the network devices nonetheless can be synchronized to the other devices in the network via their respective synchronization target, either by synchronizing to the global synchronization source using synchronization signals broadcast by a network device receiving the synchronization signals directly from the global synchronization source or using synchronization signals relayed by one or more network devices.

It should be appreciated from the foregoing that, in some cases, the synchronization targets themselves may not be receiving synchronization signals directly from the global synchronization source, but may be instead receiving synchronization signals broadcast by an intermediate, intervening network device serving as their synchronization target. Thus, this interconnection of the various network devices to each other as parent and child network devices to provide a synchronization target hierarchy for providing synchronization signals to the variously disposed network devices may create a synchronization tree, with the various network devices as network devices of the tree. Network devices in the synchronization tree may be children network devices of their respective synchronization target parent network devices, and synchronization target parent network devices may be parent network devices to their respective children network devices. Furthermore, a network device may have a child network device that itself has children network devices. The child network device and the children network devices thereof are said to be downstream of the parent network device, and are said to be downstream children of the parent network device.

As can be appreciated from the aforementioned synchronization tree structure, some network devices may be directly receiving synchronization signals from the global synchronization source and thus, may be said to be one hop away from the global synchronization source. These network devices are thus said to have a synchronization tree stratum level of one. Network devices receiving synchronization signals broadcast from a synchronization target in the synchronization tree are said to be more than one hop away from the global synchronization source due to the synchronization signal being provided by one or more intermediary, intervening network devices, wherein the number of hops depends upon the network device's placement in the synchronization tree hierarchy. Accordingly, a stratum level of such a network device indicates the number of hops that exist between the network device and the global synchronization source of the network.

A stratum index of a network device may be used to indicate the particular stratum level of the network device. Thus, network devices that are connected directly to the global synchronization source may be said to have a stratum level of 1, and may be configured with a stratum index of 1. A network device using a stratum level 1 network device as synchronization target may be said to be two hops away from the global synchronization source, i.e., one hop from the device to the synchronization target, and another hop from the synchronization target to the global synchronization source. Such a network device may thus be configured with a stratum index of 2. A network device using a stratum level 2 network device as synchronization target may be said to be three hops away from the global synchronization source, and may be configured with a stratum index of 3, and so on. Generally, the stratum index of a network device may be equal to the stratum index of its synchronization target plus a non-zero, positive number. The non-zero, positive number may indicate a distance between the network device and its synchronization target. For example, the stratum index of a network device may be equal to the stratum index of its synchronization target plus the distance, in hops, between the network device and its synchronization target.

In operation of a wireless network, any particular network device may fail. When this happens, any network device configured with the failed network device as its synchronization target, as well as any network devices downstream in the synchronization tree, will be in danger of losing synchronization. Thus, in this case, fast and efficient selection of a new synchronization target for the network device is of paramount importance. A number of techniques for selecting a new synchronization target have been utilized. However, these techniques have generally not been well suited for use with respect to some network scenarios and/or configurations. For example, the existing synchronization techniques are overly restrictive, and often ineffective, when operating under certain standard operational constraints.

One technique for selection of a synchronization target, as shown in U.S. Pat. No. 8,213,405, uses quality metrics for selecting or reselecting a synchronization target. A network device may be selected as a new synchronization target only if it has higher quality metrics than the current synchronization target. Thus, when a first device loses its synchronization target, it may only select a second device as a synchronization target if the quality metrics of the second device are higher than the quality metrics of the failed synchronization target. Such technique is not well suited for use in network situations where a network device with higher quality metrics than the failed synchronization target is not available, even if a network device with lower quality metrics that the failed synchronization target is available. In this case, this technique will not select the network device with lower quality metrics as synchronization target, even though it is available, and synchronization of the first network device will be lost. As such, this technique provides an overly restrictive solution that is not effective in all operational conditions.

Some techniques for selection of a synchronization target for a network device may not restrict selection of a new synchronization target to only those network devices having a lower stratum index than the stratum index of the network device. A first network device may synchronize to a second network device regardless of the second network device's stratum index. Such technique, however, is not suitable for network deployments that employ a global synchronization source. For example, the second network device may be a child network device of the first network device and thus, may have a higher stratum index than the first network device. The first network device may decide to synchronize to the second network device, not knowing that the second network device is its child network device, which is itself synchronized to the first network device. Thus, under these techniques, a first network device would not be precluded from synchronizing to its own child network device that is itself synchronized to the first network device. Hence, neither the first network device nor the second network device would be synchronized to the global synchronization source. As such, these technique provides a solution that is not effective in all operational conditions.

BRIEF SUMMARY OF THE INVENTION

The present invention is directed to methods and systems which provide for synchronization target selection by configuring a network device with an assigned stratum index (referred to herein as an "artificial stratum index") that does not accurately indicate a number of hops between the network device and a global synchronization source. Synchronization target selection operation configuring a network device with an artificial stratum index may comprise downgrading (e.g., increasing) the current stratum index of the network device to the artificial stratum index. For example, embodiments of the present disclosure provide for selection of a new synchronization target for a network device when the network device loses its current synchronization target by downgrading the current stratum index of the network device to an artificial stratum index until selection of a new synchronization target is made. By downgrading the stratum index of a network device to an artificial stratum index before selection of a new synchronization target, embodiments of the present disclosure allow for selection of available synchronization targets with stratum indices higher than that of the failed synchronization target as well as synchronization targets with stratum indices that are higher than or equal to the network device's stratum index. This provides an advantage over existing approaches, which are ineffective in these operational conditions.

In some embodiments, the current stratum index and the artificial stratum index of a network device may be broadcast to other network devices in the network, such as in a channel used for broadcasting synchronization signals by the network device. In particular, the artificial stratum index of a network device may be transmitted downstream from the network device to its downstream children network devices (e.g., network devices that are configured with the network device as their synchronization target). In some embodiments, the children network devices may (e.g., upon determining that their synchronization target network device has an artificial stratum index) correspondingly downgrade their own stratum indices, based on the artificial stratum index of the network device, wherein these network devices' children network devices may likewise propagate the stratum index downgrade. The network device's selection of a new synchronization target may be performed after the downstream propagation of the stratum index downgrade to children network devices is complete. After selection of a new synchronization target, the network device's stratum index may be upgraded (e.g., lowered) from the artificial stratum index, based on the stratum index of the new synchronization target, and the new upgraded stratum index of the network device may be broadcast to the children network devices of the network device. The children network devices may (e.g., upon determining their synchronization target network devices' new upgraded stratum index) upgrade their own stratum indices, based on the upgraded stratum index of the network device, and propagate the stratum index upgrade to their children network devices.

By propagating the artificial stratum index to downstream children network devices before a network device's selection of a new synchronization target, embodiments of the present disclosure ensure that the network device does not select one of its own downstream children network devices. It should be appreciated that a network device selecting one of its children network devices, or any downstream network device of such a network device, as a synchronization target would create a synchronization loop in which a parent network device is synchronized to a child network device that is itself synchronized to the parent network device. In a synchronization loop, the network devices are not synchronized to the global synchronization source, but rather to each other in a loop, with no path to the global synchronization source. Thus, embodiments provide for synchronization target selection without resulting in a synchronization loop.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawings, in which.

DETAILED DESCRIPTION OF THE INVENTION

Figure 1:
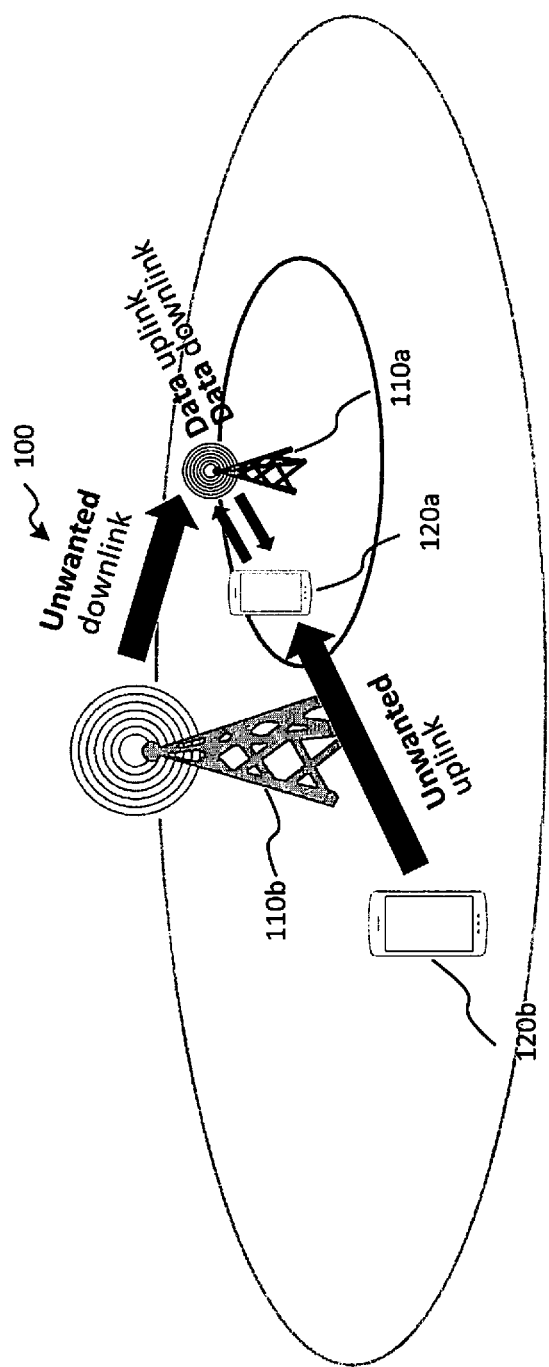
FIG. 1 illustrates a network system configured with wireless communication capabilities.

As noted above, in a synchronous communications network, such as wireless network 100 shown in FIG. 1, network devices are to be synchronized to a global synchronization source in order to ensure that transmissions are aligned and to avoid or minimize interference caused by transmissions of the network devices within the network. For example, a network, such as network 100 shown in FIG. 1, may operate in TDD mode. In TDD operation of network 100, transmissions between the various network devices may be time synchronized. In this case, each of base stations 110a and 110b and mobile devices 120a and 120b may be time synchronized. For example, synchronization signals may be transmitted to each of base stations 110a and 110b and mobile devices 120a and 120b from a global synchronization source (not shown). The synchronization signals from the global synchronization source may be used by base stations 110a and 110b and mobile devices 120a and 120b to synchronize their respective communications in network 100.

When a device within the network is not properly synchronized, however, interference with other transmissions may occur due to the transmission misalignment. For example, if base station 110a and mobile device 120a are not properly synchronized to the other devices of network 100, their downlink (DL) and uplink (UL) will be misaligned with the ULs and DLs of base stations 110b and mobile device 120b. In this case, base station 110a, while expecting to receive interference-free UL transmissions from mobile device 120a, may be subjected to interference from transmissions on the misaligned DL of base station 110b. Mobile device 120a, while expecting to receive interference-free DL transmissions from base station 110a, may also be subjected to interference from transmissions on the misaligned UL of mobile station 120b. Similarly, if base station 110b and mobile device 120b are not properly synchronized to the other devices of network 100, their misaligned transmissions may cause interference for base station 110a and mobile device 120a. Thus, it may be critically important to ensure that each of base stations 110a and 110b and mobile devices 120a and 120b of network 100 are properly synchronized.

Figure 2A:
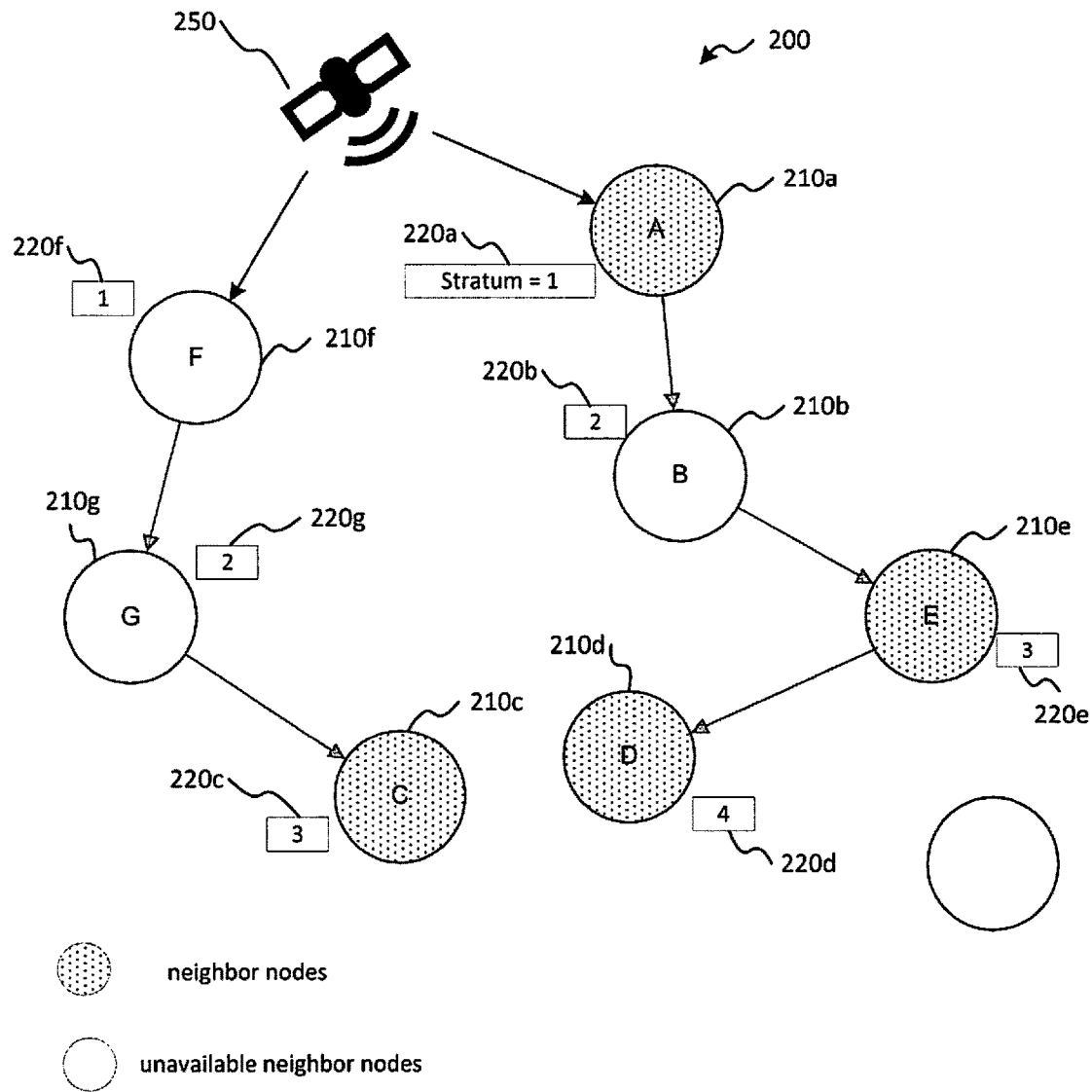
FIG. 2A illustrates a functional diagram of an exemplary system configured with capabilities and functionality for selection of a new synchronization target in a wireless network according to aspects of the present disclosure.

FIG. 2A shows a functional diagram of an exemplary system adapted to provide synchronization target selection in a wireless network in accordance with aspects of the present disclosure. In particular, FIG. 2A shows wireless network 200 that includes network devices 210a-g. In aspects, each of network devices 210a-g may be a base station, or part of a base station, operating in a wireless communication network. For example, any or all of network devices 210a-g may be an evolved node B (eNodeB), a macro cell, a femtocell, a pico cell, or another type of base station (e.g., access point, network "hot spot" device, etc.), or a part thereof, one or more of which are disposed within communication range of others of the network. Such base stations may, for example, be deployed for facilitating wireless communications for various user equipment, terminal devices, etc., such as mobile devices 120a and 120b of FIG. 1. Additionally or alternatively, any or all of network devices 210a-g may be a mobile device, such as a Smartphone, a personal digital assistant (PDA), a tablet computing device, a laptop computing device, or another type of wireless communication device. Network devices 210a-g may be configured to communicate with one or more wireless entities and/or networks, and with other network devices, according to one or more protocols (e.g., a $3^{rd}$ Generation (3G) protocol, a 4G/LTE protocol, an 802.11 protocol, an 802.16 protocol, etc.). Wireless network 200 may be a cellular communication network, a cellular data network, a wireless local area network (WLAN), etc. In some aspects, wireless network 200 may be configured to operate as a synchronous communication network. For example, wireless network 200 may operate in TDD mode.

Wireless network 200 may be operated within some standard operational constraints. For example, wireless network 200, or some portion thereof, may not be configured with backhaul links (e.g., one or more base stations may operate without benefit of wired backhaul links to network infrastructure, such as may provide certain configuration and operational data, network traffic, etc.). Additionally or alternatively, at least some portion of wireless network 200 may be configured with backhaul links, although backhaul signaling for synchronization may not be possible because, for example, an operator may restrict private communication amongst network devices 210a-g over the backhaul links. Therefore, in either case, synchronization of some or all of network devices 210a-g may be accomplished without employing backhaul signaling, such as by relaying or otherwise coordinating synchronization signals provided by a global synchronization source (e.g., global synchronization source 250) through the network.

Global synchronization source 250 may be a device, system, or network entity that is configured to operate as a common synchronization source to which every network device in wireless network 200 is synchronized. In various aspects, global synchronization source 250 may be a single device or entity, may be a system or part of a system, or may be distributed over several entities. For example, global synchronization source 250 may comprise one or more synchronization servers, one or more GPS satellites. In various aspects, global synchronization source 250 may comprise a macro base station. For example, various low-power small cells may be deployed within the coverage of a high-power macro base station. In this case, the high-power macro base station may serve as a global synchronization source for the low-power small cells. It is noted that although FIG. 2A shows synchronization source 250 as part of wireless network 200, synchronization source 250 may not be part of wireless system 200, and may be a global synchronization source external to wireless network 200. For example, wireless network 200 may comprise a cellular network or other wireless network and global synchronization source 250 may comprise apparatus of a system external thereto (e.g., GPS).

Global synchronization source 250 may provide synchronization signals that are transmitted to the network devices, which the network device may use in establishing synchronous operation with other network devices of the network. However, as noted above, the synchronization signals provided by global synchronization source 250 may not be reliably received by all network devices using such synchronization signals to establish desired synchronization. For example, GPS receivers are typically restricted to outdoor deployments or other deployments having a relatively clear view of the sky, as their performance indoors and otherwise obstructed areas is extremely limited. Thus, a network device adapted for using GPS synchronization may not be able to reliably receive synchronization signals when deployed in some situations.

In the exemplary example illustrated in FIG. 2A, global synchronization source 250 may transmit synchronization signals within wireless network 200, wherein network devices 210a and 210f may be disposed (e.g., deployed outdoors or deployed indoors near an exterior parameter) to reliably receive the synchronization signals from global synchronization source 250 and use the synchronization signals to synchronize. However, network devices 210b-e and 210g illustrated in FIG. 2A may not be disposed (e.g., deployed indoors in an interior space or deployed in an area heavily shadowed by terrain or buildings) to reliably receive the synchronization signals from global synchronization source 250. In this case, network devices 210b-e and 210g may be configured to synchronize using synchronization signals broadcast by a synchronization target rather than using synchronization signals transmitted directly by global synchronization source 250. For example, network device 210b may be within communications range of network device 210a, which may be synchronized directly to global synchronization source 250. As such, network device 210b may receive a synchronization signal broadcast by network device 210a and thus be configured with network device 210a as its synchronization target. Similarly, network device 210e may be within communications range of network device 210b, which may be synchronized to global synchronization source 250 using a synchronization signal broadcast by network device 210a. As such, network device 210e may receive a synchronization signal broadcast by network device 210b and be configured with network device 210b as its synchronization target. Likewise, network devices 210c, 210d, and 210g, which may not be able to receive the synchronization signals directly from global synchronization source 250, may be synchronized by being configured with a synchronization target network device that is within range of these network devices. For example, network device 210d may be configured with network device 210e as its synchronization target, network device 210g may be configured with network device 210f as its synchronization target, and network device 210*c* may be configured with network device 210*g* as its synchronization target.

As can be appreciated from the foregoing, synchronization signals from global synchronization source 250 may relayed to a network device by its synchronization target network device. In this way, network devices 210*b-e* and 210*g* may be provided the synchronization signals from global synchronization source 250 and may be able to use the synchronization signals to synchronize their operations with other network devices in the network. In aspects of the disclosure, a child network device (e.g., network devices 210*b-e* and 210*g*) may not be provided the synchronization signals from global synchronization source 250 by its synchronization target, but instead may be provided with synchronization signals generated by a synchronization target suitable for establishing synchronous operation in the network. In either case, as the synchronization target has synchronized operations with other network devices in the network (e.g., using synchronization signals directly provided from global synchronization source 250 or derived therefrom), the child network device may also synchronize its own operations with other network devices in the network by synchronizing to a synchronization target network device. Accordingly, network devices 210*b-e* and 210*g*, while unable to receive synchronization signals directly from global synchronization source 250, are nonetheless able to properly synchronize operation with respect to the other network devices. It is noted that synchronizing to a synchronization target network device may refer to synchronizing directly to the synchronization target network device, or may refer to the situation where a network device synchronizes to the global synchronization source using synchronization signals relayed by the synchronization target network device.

Configuring network devices 210*a-g* of wireless network 200 for synchronization by relaying or otherwise coordinating synchronization signals provided by a global synchronization source through the network in accordance with the disclosure herein, may create a synchronization tree with parent network devices and children network devices. For example, with reference to FIG. 2A, network device 210*b* may be configured with network device 210*a* as its synchronization target. Thus, network device 210*b* is a child network device of parent network device 210*a*. Network device 210*e* may be configured with network device 210*b* as its synchronization target and network device 210*d* may be configured with network device 210*e* as its synchronization target. Thus, network device 210*e* is a child network device of parent network device 210*b*, and child network device 210*d* is a child network device of parent network device 210*e*. It is noted that a network device may be both a parent to one network device and child of another network device. The parent-child network device relationship of the network devices creates the synchronization tree mentioned above. In this example, the synchronization tree may include a path from network device 210*d* to global synchronization source 250, defined from network device 210*d* to its parent network device 210*e*, then from network device 210*e* to its parent network device 210*b*, then from network device 210*b* to its parent network device 210*a*, and then from network device 210*a* to global synchronization source 250.

Each network device in wireless network 200 may have a stratum index. In some aspects, the stratum index of a particular network device may indicate the distance (e.g., in hops) that exist between the particular network device and the global synchronization source, following the synchronization tree (the stratum indices of the exemplary embodiment illustrated in FIG. 2A being indicated by reference numerals 220*a*-220*g*). For example, network device 210*b* may be configured with network device 210*a* as a synchronization target, and network device 210*a* may be directly coupled to global synchronization source 250. As such, there is a distance of two hops between network device 210*b* and global synchronization source 250. It will be appreciated that the two hops may include one hop from network device 210*b* to network device 210*a*, and then another hop from network device 210*a* to global synchronization source 250. In this case, network device 210*b* may have a stratum index of 2. In another example, network device 210*e* may have a stratum index of 3, as there may be three hops between network device 210*e* and global synchronization source 250 (e.g., one hop from network device 210*e* to network device 210*b*, one hop from network device 210*b* to network device 210*a*, and one hop from network device 210*a* to global synchronization source 250).

The stratum index of a network device may be transmitted to other network devices in the network. For example, a network device may broadcast its stratum index to other network devices over its air interface, such as using a same broadcast channel used to transmit synchronization signals by the network device. In some aspects, the stratum index may be broadcast in a reference signal (RS) transmitted by the network device. For example, network device 210*b* may transmit its stratum index to the other network devices in wireless network 200 by including the stratum index in a reference signal, or by modulating the reference signal based on its stratum index. Other network devices receiving the reference signal from network device 210*b*, such as network devices 210*c*, 210*d*, or 210*e*, may determine the stratum index of network device 210*b* by processing the reference signal. In various aspects, the reference signal may be transmitted at different timeslots based on the stratum index. For example, network devices receiving the reference signal at a particular timeslot from network device 210*b*, such as network devices 210*c*, 210*d*, or 210*e*, may determine the stratum index of network device 210*b* by determining the timeslot in which the reference signal was transmitted. In yet other aspects, an LTE System Information Broadcast (SIB) channel may be used to carry the stratum index explicitly. In this case, a network device may receive the stratum index via the SIB channel. In still other aspects, for example where a backhaul link is available, a backhaul message for transmitting the stratum index to neighbor network devices may be defined.

It will be appreciated that a network device with a lower stratum index may have a closer connected proximity to the global synchronization source and thus, be a more desirable synchronization target for other network devices. In some aspects, for example where a GPS synchronization source is used, a lower stratum index may indicate that a network device may be closer to the global synchronization source, or may be closer to an area where synchronization signals are stronger. For example, network device 210*a* may be deployed outdoors and thus, may receive strong synchronization signals. Network device 210*a* may have a stratum level of 1. Network device 210*b* may be deployed indoors and thus, may not receive synchronization signals strong enough for synchronization Nonetheless, network device 210*b* may be within range of network device 210*a*. Network device 210*b* may be configured with network device 210*a* as its synchronization target, which is connected directly to global synchronization source 250. Network device 210*b* may be configured with a stratum index of 2. Thus, in this case, a stratum index of 1 indicates a network device that is closer to a strong synchronization than a network device with a stratum index of 2.

Additionally, a network device with a lower stratum index may have a shorter path to the global synchronization source and thus, may itself provide more accurate synchronization signals. For example, network device 210b may have a stratum index of 2 whereas network device 210e may have a stratum index of 3. In this example, the stratum index may indicate the number of hops between the network device and the global synchronization source. Thus, in this case, there may be two hops between network device 210b and global synchronization source 250, and there may be three hops between network device 210e and global synchronization source 250. Because of it closer proximity to global synchronization source 250, it may be more desirable for network device 210d to select network device 210b as a synchronization target rather than selecting network device 210e.

It should be pointed out that a tree depth of a wireless network may be determined by the largest stratum index of any of the network devices within the wireless network. Put differently, the tree depth of a wireless network may be indicated by the greatest distance (e.g., number of hops) between any network device and the global synchronization source of the network. For example, system 200 may include a number of network devices at different stratum levels. The largest stratum index in network 200 of the exemplary embodiment illustrated in FIG. 2A may belong to network device 210d, having a stratum index of 4. In this example, the stratum index may indicate the number of hops between the network device and the global synchronization source. Therefore, there may be four hops between network device 210d and global synchronization source 250. In this case, the tree depth of wireless network 200 may be determined to be 4. In some aspects, a maximum tree depth for a network may be established (e.g., by a maximum distance (e.g., number of hops) through which desired accuracy in synchronization with a global synchronization source may be maintained), and a tree depth of a network may not exceed the maximum tree depth. The maximum tree depth may be predetermined, or may be dynamically determined based on operational conditions and requirements.

As may be appreciated from the foregoing, operation to provide synchronization without employing backhaul signaling may establish an operational constraint of wireless network 200 in which a particular network device may only select a synchronization target with a stratum index lower than the stratum index of the particular network device, such as for avoiding synchronization loops. For example, network device 210b, having a stratum index of 2, may be configured with network device 210a as a current synchronization target. In this case, if network device 210b were to lose its current synchronization target (e.g., network device 210a becomes inoperative), network device 210b would be constrained to select only network devices with a stratum level lower than 2 as a new synchronization target (e.g., network device 210f). However, network device 210b may not be within communication range of such a network device (e.g., outside a wireless service area of network device 210f) and, operating under the forgoing constraint, may not select any of network devices 210c-e or 210g (i.e., none of network devices 210c-e and 210g has a lower stratum index than the stratum index of network device 210b).

During operation in accordance with aspects of the present disclosure, network device 210a, having a communication link with global synchronization source 250, may be configured with global synchronization source 250 as its synchronization target. Network device 210a may thus be synchronized based on wireless signals received via the communication link with global synchronization source 250. Network device 210b, having a communication link with network device 210a but not with global synchronization source 250, may be configured with global network device 210a as its current synchronization target. Network device 210b may thus be synchronized based on wireless signals received via the communication link with network device 210a. Other network devices, such as network devices 210c-g, may be similarly synchronized to their respective synchronization targets.

At some point during operation, the communication link between network devices 210a and 210b may fail (e.g., network device 210a may become inoperable) or network device 210a may otherwise fail to provide a proper synchronization target for network device 210b (e.g., network device 210a is unable to maintain a reliable communication link with global synchronization source 250). For example, a failure of the communication link between network devices 210a and 210b may be due to a degradation in the transmission signals over the link, a malfunction of network device 210a, interference, etc. Irrespective of the root cause, network device 210b may not be able to reliably receive synchronization signals from network device 210a to synchronize operations with other network devices of the network, and thus, network device 210b may determine to select a new synchronization target.

Figure 2B:
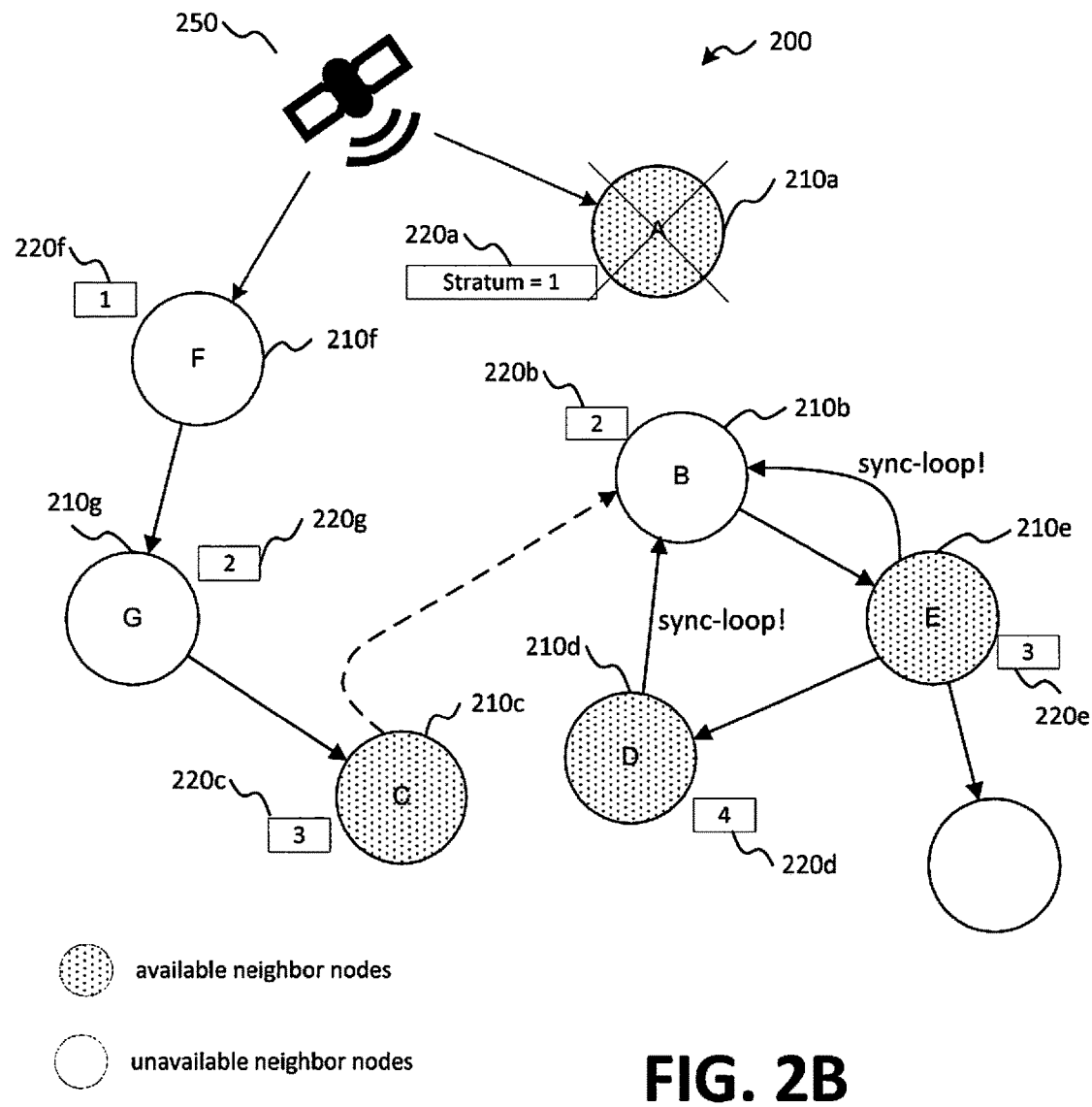
FIG. 2B illustrates another functional diagram of the exemplary system configured with capabilities and functionality according to aspects of the present disclosure.

As shown in FIG. 2B, network device 210b may have several neighbor network devices, one or more of which may be within wireless communication range of network device 210b. Some of network device 210b's neighbor network devices may be determined to be available to serve as synchronization targets and some may be determined to be unavailable to serve as synchronization targets. For example, network devices 210c, 210d, and 210e, may be determined to be available to serve as a synchronization target of network device 210b. Network devices 210f and 220g may be determined to be unavailable to serve as a synchronization target of network device 210b. In some aspects, whether a neighbor network device is available or unavailable to serve as a synchronization target of another network device may be determined based on signal measurements of the neighbor network devices. For example, signal strength and/or signal quality measurements of the signals from network device 210c received at network device 210b may be used to determine whether network device 210c is available or unavailable to serve as a synchronization target of network device 210b. In aspects, the strength and/or quality measurement may include, without limitation, Received Signal Strength Indicator (RSSI), Reference Signal Received Power (RSRP), Reference Signal Receive Quality, (RSRQ), Signal to Interference-plus-Noise Ratio (SINR), Energy to Interference Ratio (ECIO), etc. In some cases, the signal measurements may indicate whether a network device is within range of the other network device. Based on the received signal strength and/or signal quality measurements, a network device may be determined to be available or unavailable to serve as a synchronization target. For example, a network device may be determined to be available to serve as a synchronization target when the signal strength and/or signal quality measurements of signals received from the network device exceed a predetermined threshold. When the signal strength and/or signal quality measurements of signals received from a network device do not exceed a predetermined threshold, the network device may be determined to be unavailable to serve as a synchronization target.

In operation according to embodiments, network device 210b may determine the stratum index of each of its neighbor network devices available to serve as a synchronization target. For example, network device 210b may determine the stratum index of each of network devices 210c, 210d, and 210e to be 3, 4, and 3, respectively. As noted above, in some aspects, the stratum index of a network device may be determined based on reference signals received from the network device. Based on the stratum index of each neighbor network device, network device 210b may select a new synchronization target, within the operational constraints of wireless network 200. Under existing approaches, network device 210b would not select any of neighbor network devices 210c, 210d, and 210e because these network devices have a stratum index greater than the stratum index of 210b. Consequently, network device 210b would be left with no synchronization target and would be unable to synchronize its communications to the other network devices.

Moreover, even if the operational constraint of only selecting network devices with greater stratum indices as synchronization targets were removed, network device 210b may not be able to select a network device within the other operational constraints of wireless network 200. For example, network device 210b may select network device 210e as synchronization target, despite network device 210e having a greater stratum index than network device 210b. However, network device 210e is configured with network device 210b as a synchronization target. Thus, in this case, network device 210b would synchronize to network device 210c, which in turns would synchronize to network device 210b, thereby resulting in a synchronization loop. In this case, neither network device 210b nor network device 210e would be able to synchronize to global synchronization source 250, and would instead be synchronized to each other, with no path to global synchronization source 250 in the synchronization tree. Alternatively, network device 210b may select network device 210d as the new synchronization target. However, network device 210d is configured with network device 210e as a synchronization target, which is in turned configured with network device 210b as synchronization target. Thus, in this case, network device 210b, 210d and 210e would create a synchronization loop and synchronization would again fail.

It is noted that any particular network device may be aware of which network device is its synchronization target. For example, network device 210d may be aware that network device 210c is its synchronization target. However, any particular network device may not be aware of which other network devices are configured with that particular network device as synchronization target. For example, the synchronization signals transmitted by the particular network device may be broadcast without establishing a two way communication link with network devices ultimately using the synchronization signals. Accordingly, network device 210b may not be aware that network device 210e is configured with network device 210b as its synchronization target. This operational constraint further complicates selection of a synchronization target because a network device whose synchronization target has failed may not readily know whether a potential synchronization target is a child network device. Thus, a synchronization loop may not be avoided.

Figure 4A:
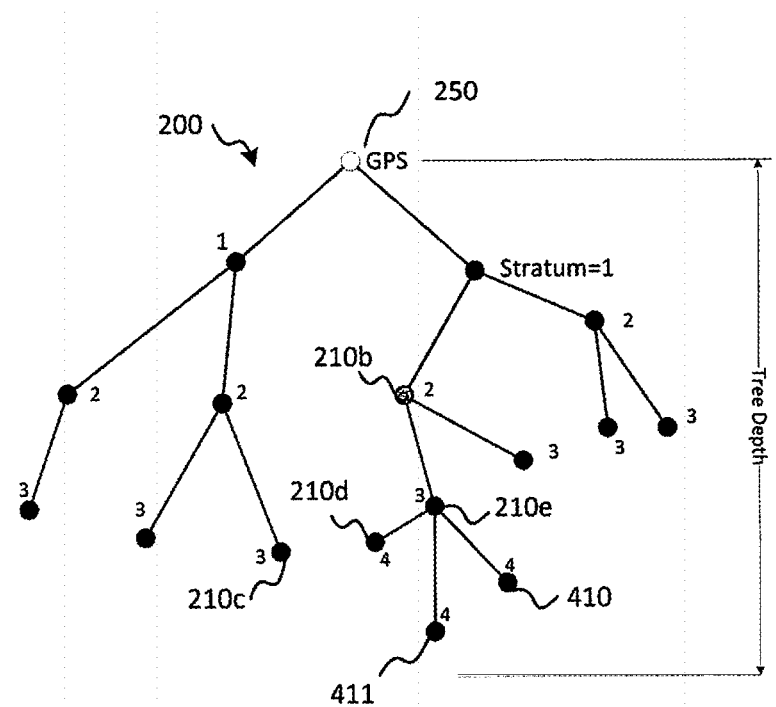
FIG. 4A illustrates a functional diagram of the exemplary system shown in FIGS. 1, 2A, and 2B, and configured with capabilities and functionality according to aspects of the present disclosure.
Figure 4B:
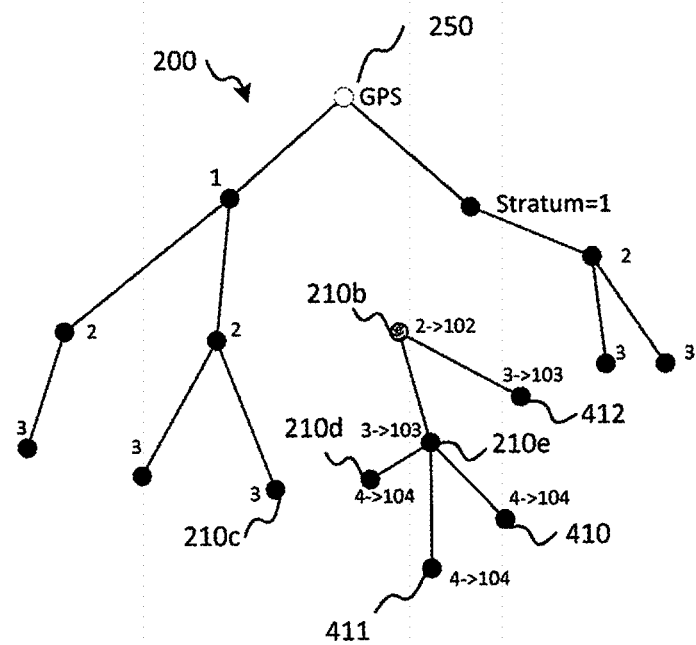
FIG. 4B illustrates another functional diagram of the exemplary system configured with capabilities and functionality according to aspects of the present disclosure.

Aspects of the present disclosure, provide advantages over existing approaches by providing a process for selecting a synchronization target within certain operational constraints. With reference to FIG. 4A, and having determined the stratum index of each of neighbor network devices 210c, 210d, and 210e, network device 210b may determine that none of neighbor network devices 210c, 210d, and 210e meet the operational constraints for selecting a new synchronization target. For example, network devices 210c, 210d, and 210e have stratum indices of 3, 4, and 3, respectively, which are greater than network device 210b's stratum index of 2. In response to this determination, operation according to embodiments provides for the stratum index of network device 210b to be downgraded to an artificial stratum index by increasing the stratum index by a value D. For example, as shown in FIG. 4B, network device 210b's stratum index may be downgraded from 2 to 102 by increasing the stratum index by D=100.

It should be appreciated that an artificial stratum index as used herein refers to a stratum index that does not accurately indicate the number of hops between a network device and the global synchronization source. For example, when network device 210b is configured with a stratum index of 2, the stratum index accurately indicates that there are two hops between network device 210b and global synchronization source 250. When network device 210b is configured with the artificial stratum index of 102, the artificial stratum index does not accurately indicate that there are 102 hops between network device 210b and global synchronization source 250 because there are not 102 hops between network device 210b and global synchronization source 250.

It is noted that although the artificial stratum index may not accurately indicate the number of hops between a network device and the global synchronization source, the artificial stratum index of embodiments is not an arbitrarily selected value. In some aspects, the artificial stratum index may be based on the tree depth of the wireless network. In these cases, the value D by which the stratum index of a network device is increased to downgrade the network device to an artificial stratum index may be determined based on the maximum tree depth allowed in a wireless network. For example, wireless network 200 may have a tree depth of 4, but may have a maximum tree depth of 100. As such, no network device operating in proper synchronization in wireless network 200 may have a stratum index greater than 100. Put differently, no network device in wireless network 200 operating in proper synchronization may be more than 100 hops away from global synchronization source 250. In this case, D may be determined as 100, which is the maximum tree depth. It will be appreciated that a value of 100 for the maximum tree depth is merely an example value, and many different values for the maximum tree depth may be envisioned. More generally, the maximum tree depth may be determined based on the network configuration, system requirements, and/or network operator preferences. For example, in various aspects, the stratum index may be broadcast to other network devices by transmitting a reference signal at a particular timeslot of a plurality of available timeslots. A network device may determine the stratum index of another network device by determining in which timeslot the received reference signal was transmitted by the other network device. In this case, the maximum tree depth may be determined by the total number of timeslots available for use to transmit the reference signal. For example, if ten timeslots are available to transmit the reference signal, then the maximum tree depth may be determined to be 10. In this case, the stratum index is indicated by the corresponding timeslot in which the reference signal was transmitted. Furthermore, D may be a predetermined value, known to each network device in the wireless network, or may be a number dynamically determined based on network conditions.

It is further noted that an artificial stratum index greater than the maximum tree depth ensures that no network device in the wireless network will attempt to select a target network device configured with such a stratum index as a synchronization target while the target network device is in the process of selecting a new synchronization target. For example, in some aspects, an artificial stratum index with a value greater than the maximum tree depth may be used to indicate to other network devices that a particular network device is unavailable to serve as a synchronization target.

In aspects, the artificial stratum index of a network device may be propagated downstream to children network devices of the parent network device through the synchronization tree. For example, referring still to FIG. 4B, after network device 210b is downgraded to an artificial stratum index of 102, the artificial stratum index may be propagated to network devices 210e and 412, each of which is configured with network device 210b as its respective synchronization target. In some aspects, propagating the artificial stratum index may include network device 210b broadcasting the artificial stratum index to other network devices. In particular, network device 210b may broadcast the artificial stratum index to its children network devices 210e and 412 via the air interface and using resource signals, as discussed above. Children network devices 210e and 412 may receive network device 210b's broadcast and may detect that network device 210b has an artificial stratum index. In particular, children network devices 210e and 412 may determine that the stratum index of network device 210b has increased. In aspects, children network devices 210e and 412 may determine that the stratum index of network device 210b has increased to be greater than the maximum tree depth of the network, and thus, has an artificial stratum index. In response to determining that network device 210b has an artificial stratum index, network devices 210e and 412 may downgrade their own stratum index to an artificial stratum index. For example, each of network devices 210e and 412 may increase its respective stratum index by D=100. It is again noted that a value of D=100 is merely for illustrative purposes, and many different values for D may be envisioned.

The downstream propagation of the artificial stratum index of embodiments continues after network devices 210e and 412 downgrade their stratum indices to artificial stratum indices. For example, network devices 210e and 412 may broadcast their respective artificial stratum index to other network devices. In particular, network device 210e may broadcast the artificial stratum index to its own children network devices 210d, 410, and 411 via the air interface and using resource signals, as discussed above. Children network devices 210d, 410, and 411 may receive network device 210e's broadcast and may detect that network device 210e has an artificial stratum index. In particular, children network devices 210d, 410, and 411 may determine that the stratum index of network device 210e has increased. In aspects, children network devices 210d, 410, and 411 may determine that the stratum index of network device 210e has increased to be greater than the maximum tree depth of the network, and thus, has increased to an artificial stratum index. In response to determining that network device 210e has an artificial stratum index, network devices 210d, 410, and 411 may downgrade their own stratum index to an artificial stratum index. For example, each of network devices 210d, 410, and 411 may increase its respective stratum index by D=100. The propagation of the artificial stratum index continues downstream until there are no more children network devices. For example, network devices 210d, 410, and 411 are the last children network devices downstream from network device 210b, an thus, the downstream propagation of the artificial stratum index stops with these network devices.

The downstream propagation of the artificial stratum index may have a particular duration. For example, a propagation of the artificial stratum index from one stratum level to another may have a duration of one timeslot. As such, in some aspects, the downstream propagation of this example may have a maximum duration of D−s timeslots, where s equals the stratum index of the network device before the network device was downgraded with the artificial stratum index. For example, network device 210b, before being downgraded, may have a stratum index of 2. Given a maximum tree depth equal to D=10, and since no network device may have a stratum index greater than the maximum tree depth, the maximum duration for propagating a stratum index downstream from network device 210b may be D−s=10−2=8 timeslots. In this case, network device 210b may wait 8 timeslots before selecting a new synchronization target to allow for the downstream propagation to be completed.

Figure 5:
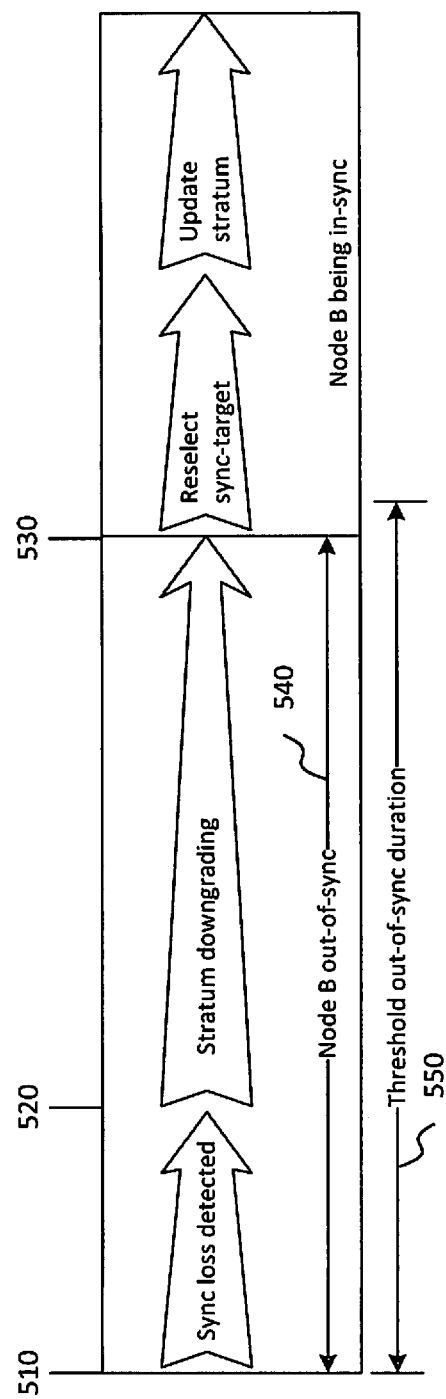
FIG. 5 shows a diagram illustrating an example of an out-of-sync duration threshold.

It should be appreciated from the foregoing that, in some cases, the value of D is selected such that the length of time a network device is out of sync (e.g., not connected to a synchronization target) does not exceed a threshold out-of-sync duration. For example, with reference to FIG. 5, a network device may lose its synchronization target at time 510, and may downgrade its stratum index to an artificial stratum index at time 520. The network device may propagate the artificial stratum index downstream until time 530, at which time the network device may select a new synchronization target. It is noted that during time 540, the network device may not have a synchronization target and thus, may be out-of-sync. Given that the total duration of the downstream propagation may be dependent on D, as discussed above, aspects of the present disclosure provide for selection of D such that the length of time network device is out-of-sync does not exceed threshold out-of-sync duration 550. In some aspects, if the length of time network device is out-of-sync exceeds threshold out-of-sync duration 550, selection of a new synchronization target is aborted and an out-of-sync failure for network device is generated. The threshold out-of-sync duration may be determined based on the network implementation and requirements.

In aspects, once the downstream propagation has been performed, a new synchronization target may be selected by the network device. For example, referring back to FIG. 4B, network device 210b has been downgraded to artificial stratum index 102, and the new artificial stratum index has been propagated downstream to network devices 210d. 210e, and 410-412. It is noted that network device 210c has kept a stratum index of 3, as network device 210c, while a neighbor network device of network device 210b, is not in the downstream tree of network device 210b. Also, it will be appreciated that because only the stratum index of neighbor network devices 210d and 210e has changed, these network devices remain neighbor network devices of network device 210b otherwise putatively available to serve as synchronization targets of network device 210b.

Figure 4C:
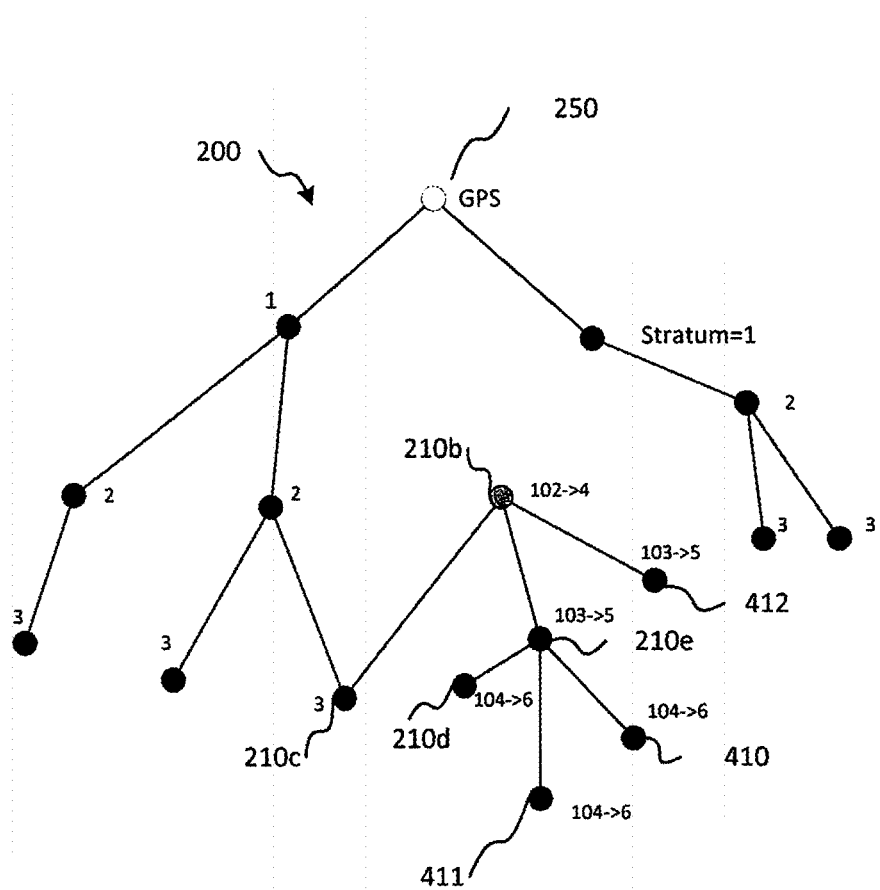
FIG. 4C illustrates yet another functional diagram of the exemplary system configured with capabilities and functionality according to aspects of the present disclosure.

In some aspects, after downstream propagation, the network device may determine the stratum index of each neighbor network device available to serve as synchronization targets of the network device. For example, network device 210*b* may determine the stratum index of each of network devices 210*c*, 210*d*, and 210*e* to be 3, 104, and 103, respectively. Based on the stratum indices of the neighbor network devices, and within the operational constraints of wireless network 200, network device 210*b* may select a neighbor network device with a lower stratum index than network device 210*b*'s artificial stratum index as its new synchronization target. For example, network device 210*b* may select network device 210*c*, with stratum index 3, as network device 210*b*'s new synchronization target. It is noted that in the example illustrated in FIG. 4C, of all neighbor network devices available to serve as a new synchronization target for network device 210*b*, only network device 210*c* has a better stratum index than network device 210*b*'s artificial stratum index. In some aspects, in particular when there are multiple neighbor network devices available to serve as a new synchronization target with a lower stratum index than the network device, the network device may select from among the multiple network devices based on various considerations. For example, a network device may select a new synchronization target based at least in part on the signal strength and quality of the potential new synchronization target, or based on the timing offset between the network device and the potential new synchronization target.

Once a network device has selected a new synchronization target, the network device may synchronize to the new synchronization target in accordance with the description above. Furthermore, the network device's artificial stratum index may be upgraded to reflect its new situation. For example, with reference to FIG. 4C, network device 210*b* may have selected network device 210*c* as its new synchronization target. Network device 210*c* may have a stratum index of 3. Accordingly, in operation according to embodiments, network device 210*b*'s artificial stratum index of 102 may be upgraded to reflect its having a network device with a stratum index of 3 as synchronization target. Thus, network device 210*b*'s stratum index may be upgraded from artificial stratum index 102 to a new stratum index of 4. In aspects, the upgraded stratum index of network device 210*b* may be propagated downstream to its children network devices 210*d*, 210*e*, and 410-412. The downstream propagation of the upgraded stratum value is similar to the downstream propagation of the artificial stratum index discussed above.

Having described aspects of the present disclosure providing for selection of a new synchronization target, a block diagram of an exemplary processor based system configured in accordance with aspects of the present disclosure is now discussed with reference to FIG. 3. Furthermore, it is noted that the above discussion describes a process for selection of a new synchronization target that specifically includes downgrading a stratum index to an artificial stratum index, and which may be employed when no network device meeting the standard operational constraints is available for selection. The following discussion of a system and its operations describes a broader process which includes the aforementioned downgrade approach to selection of a new synchronization target. However, the broader process described below also includes procedures that may be employed in any network situation. That is, the broader approach below may be used when a network device meeting the standard operational constraints is available for selection and when such a network device is not available.

Figure 3:
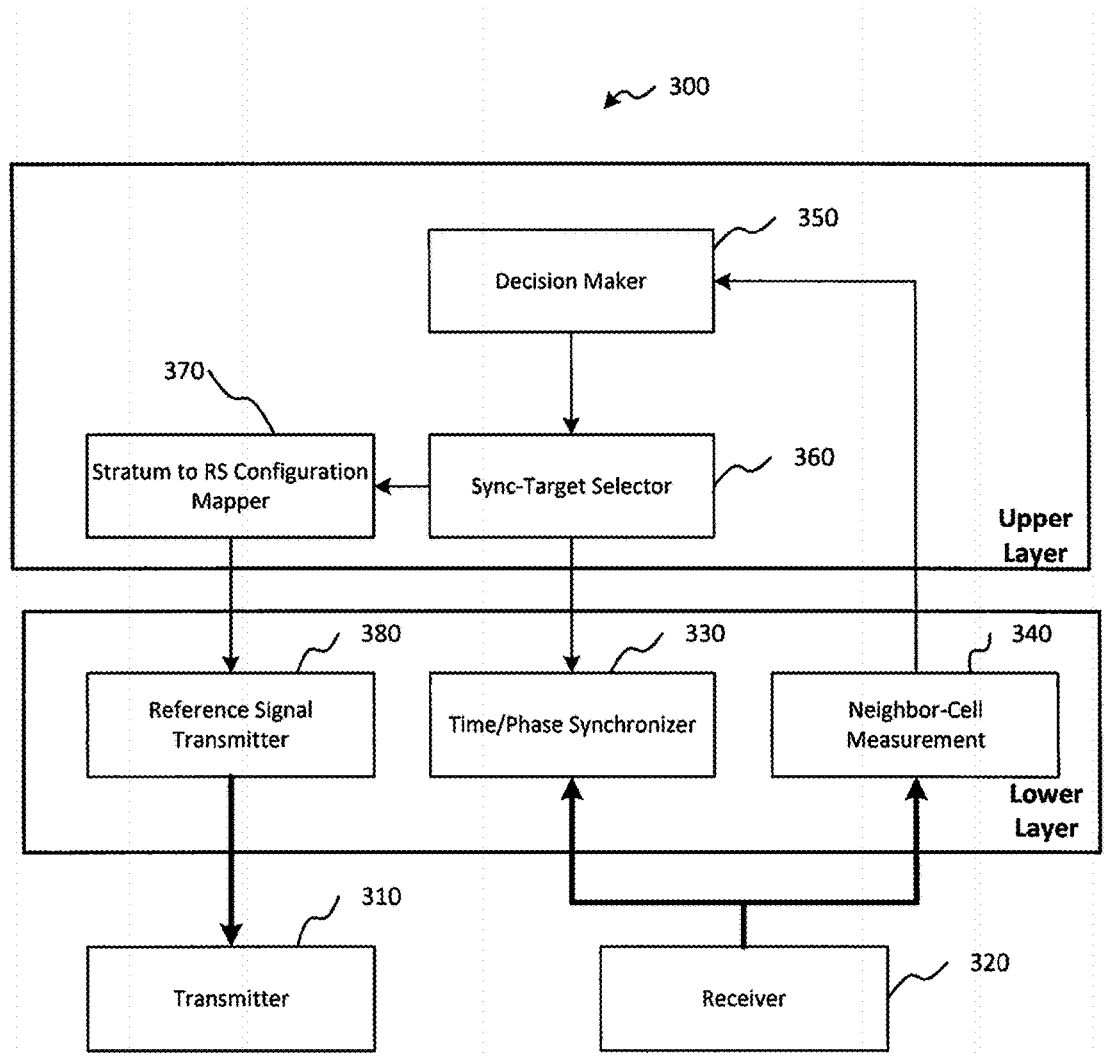
FIG. 3 illustrates a block diagram of an exemplary system configured with capabilities and functionality according to aspects of the present disclosure.

System 300 of the embodiment illustrated in FIG. 3 is adapted to provide synchronization target selection in a wireless network. In an aspect, system 300 may be a network device, such as any of network devices 210*a-g* operating in a wireless communication network (e.g., network 200). As shown in FIG. 3, system 300 includes a transmitter 310, receiver 320, neighbor cell measurement 340, time/phase synchronizer 330, reference signal transmitter 380, stratum to RS configuration mapper 370, decision maker 350, and sync-target selector 360.

It should be appreciated that the various modules illustrated in FIG. 3, or portions thereof, may be implemented as code segments (e.g., software, firmware, and/or hardware logic) to perform the tasks and functions described herein. Such code segments may be executed by one or more processor (e.g., a central processing unit (CPU), an application specific integrated circuit (ASIC), a programmable gate array (PGA), one or more core processors of a multi-core processor, etc.) of system 300 to provide operation of embodiments herein. The code segments can be stored in a processor readable medium, such as may include any medium that can appropriately store the information. Examples of a processor readable medium of embodiments include an electronic circuit, a semiconductor memory device, a read only memory (ROM), a flash memory, an erasable ROM (EROM), a compact disk ROM (CD-ROM), an optical disk, a hard disk, etc.

Transmitter 310 and receiver 320 may include hardware and/or software for transmitting and receiving data, through a transmission medium, to and from a receiver and transmitter. Although transmitter 310 and receiver 320 are illustrated as separate entities, in some aspects, they are included in a single module (e.g., a transceiver) that provides transmitting and receiving operations. In particular, transmitter 310 may be used to transmit signals that may be used by other network devices to measure signal strength and quality to determine whether system 300 may be available to serve a synchronization target for another network device, in accordance with the operations discussed above. Additionally, transmitter 310 may also be used to transmit synchronization signals that may be used by children network devices to synchronize to system 300.

In some aspects, transmitter 310 may be used, in cooperation with stratum to RS configuration mapper 370 and reference signal transmitter 380, to transmit the stratum index of system 300 to other network devices. For example, stratum to RS configuration mapper 370 may be used to include the stratum index in a reference signal. In some aspects, a stratum index may be mapped to a particular timeslot for transmitting a reference signal, may be mapped to a particular configuration setting for modulating the reference signal, or may be mapped to a particular configuration for multiplexing the stratum index and the reference signal together. The mapping may be then provided to reference signal transmitter 380, which may generate the reference signal based on the mapping determined by the stratum index. The reference signal including the stratum index may then be provided to transmitter 310 for broadcast to other network devices, such that a receiving network device may obtain the stratum index by determining the particular mapping used in the transmission of the reference signal.

Receiver 320 may be used to receive signals at system 300. The received signals may include reference signals transmitted from other network devices, as discussed above. These reference signals may indicate a stratum value of the network device from which the signals are received. In some aspects, receiver 320 may be used, in cooperation with neighbor cell measurement 340, to receive and process signals that may be used to measure the status of a communication link between system 300 and a synchronization target network device of system 300. For example, neighbor cell measurement 340 may process signals received via receiver 320 from a synchronization target network device. In some aspects, neighbor cell measurement 340 processes the signals and provides the measurement to decision maker 350 to determine the status of the communication link with the synchronization target network device. The status of the communication link may be determined by decision maker 350 based on the instantaneous or ensemble statistics of historical strength and/or quality measurements of the received signal. The strength and/or quality measurements of the signal may include, without limitation, RSSI, RSRP, RSRQ, SINR, timing offset with respect to each neighbor device, etc. Based on the status of the communication link, decision maker 350 may determine that selection of a new synchronization target may be appropriate. Thus, receiver 320, neighbor cell measurement 340, and/or decision maker 350 may determine whether a link between a network device and a synchronization target has failed. Furthermore, receiver 320, neighbor cell measurement 340, and/or decision maker 350 may also be used to trigger a reselection of a new synchronization target.

In some aspects, receiver 320, neighbor cell measurement 340, and/or decision maker 350 may also be used to receive and process signals that may be used to measure signal strength and quality, to measure timing offsets with respect to neighbor network devices, and to determine whether a network device transmitting these signals may be available to serve as a synchronization target for system 300, as described above. For example, system 300 may use neighbor cell measurement 340 and receiver 320 to measure the signal strength and quality of signals from neighbor network devices. In various aspects, system 300 may use neighbor cell measurement 340 and receiver 320 to measure the timing offset between system 300 and the neighbor network devices from which signals are received. Decision maker 350 may be used to identify those neighbor network devices that are available to serve as synchronization targets, and/or also those network devices that are unavailable to serve as synchronization targets, based on the measurements from neighbor cell measurement 340 and receiver 320.

Additionally or alternatively, receiver 320 may also be used to receive synchronization signals from the synchronization target network device of system 300, as described above. For example, receiver 320 and time/phase synchronizer 330 may be used to synchronize system 300 based on signals received from a synchronization target network device. Signals received from a synchronization target network device may be used by time/phase synchronizer 330 to adjust timing differences with respect to the signals as transmitted from the synchronization target network device and as received by system 300.

Sync-target selector 360 may be configured to select a synchronization target for system 300. In aspects, sync-target selector 360 may be configured to perform the selection of a synchronization target within specific constraints, as discussed above. In particular, sync-target selector 360 may be configured to perform selection of a synchronization target, while selecting a network device with a lower stratum index than the stratum index of system 300, and without resulting in a synchronization loop. In aspects, sync-target selector 360 may be configured with at least three procedures: an upgrade procedure, a downgrade procedure, and a stratum propagation procedure. The following description of the functions, procedures, and operations of sync-target selector 360 is made with reference to the diagram illustrating example blocks executed to implement aspects of the present disclosure shown in FIG. 6. It is noted that the process according to the example aspect illustrated by FIG. 6 may be implemented in a network, such as wireless network 200. Furthermore, in some aspects, the upgrade procedure, the downgrade procedure, and the stratum propagation procedure according to the example aspects illustrated by FIG. 6 may be implemented by sync-target selector 360.

At block 600, a network device, such as network device 210b of FIG. 2A, may detect that it is unable to receive, or unable to reliably receive, synchronization signals from its current synchronization target. For example, network device 210b may determine that it is unable to receive, or unable to reliably receive, synchronization signals from synchronization target network device 210a, such that synchronization of network device 210b to network device 210a may not be accomplished. In response, network device 210b may determine to select a new synchronization target. To that end, network device 210b may determine the stratum index of each neighbor network device that is available to serve as a new synchronization target. For example, network device 210b may identify network devices 210c, 210d, and 210e as neighbor network devices that are available to serve as new synchronization targets.

At block 602, network device 210b may determine whether any of the neighbor network devices available to serve as new synchronization targets has a lower stratum index than the stratum index of network device 210b. It is noted that a current synchronization target of a network device may refer to the synchronization target with which the network device is currently configured, whether or not the network device's communication link with the current synchronization target has failed. For example, network device 210b, which is currently configured with network device 210a as its synchronization target, may determine if any of its neighbor network devices has a stratum index that is lower than network device 210b's stratum index of 2. If network device 210b identifies a network device in the neighbor network devices with a lower stratum index than the stratum index of network device 210b, then network device 210b proceeds to block 604. At block 604, network device 210b may determine whether the neighbor network device identified at block 602 has a synchronization target with a stratum index that is equal to the stratum index of network device 210b's current synchronization target. For example, network device 210b, which is currently configured with network device 210a as its synchronization target, may determine if the neighbor network device identified at block 602 has a stratum index that is equal to 1, namely the stratum index of network device 210a. If network device 210b determines that the neighbor network device identified at block 602 has a synchronization target with a stratum index that is equal to the stratum index of network device 210b's current synchronization target, then network device 210b proceeds to block 624.

At block 624, network device 210b selects network device 210f as its new synchronization target and changes its configuration to reflect the change. Network device 210b may then use synchronization signals from its new synchronization target to establish synchronous operation with other network devices of the network. Because network device 210b's new synchronization target has the same stratum index as network device 210b's current (although now previous) synchronization target, there is no need to configure network device 210*b* with a new stratum index. At this point, the process according to the example aspect illustrated by FIG. 6 may stop.

Referring back to block 604, if network device 210*b* determines that the neighbor network device identified at block 602 does not have a synchronization target with a stratum index that is equal to the stratum index of network device 210*b*'s current synchronization target, then network device 210*b* proceeds to block 620. At block 620, network device 210*b* selects the neighbor network device identified at block 602 as its new synchronization target and changes its configuration to reflect the change. Network device 210*b* may then use synchronization signals from its new synchronization target to establish synchronous operation with other network devices of the network. Network device 210*b* operations then proceed to block 622, where network device 210*b* executes the upgrade procedure of sync-target selector 360.

The upgrade procedure of a network device's sync-target selector may include configuring the network device with a lower stratum index. For example, network device 210*b* may be configured with global synchronization source 250 as its new synchronization target. Thus, network device 210*b* may no longer be two hops away from global synchronization source 250, but rather may only be one hop away. As such, network device 210*b* may be configured with a new upgraded stratum index of 1. It will be noted that, the new upgraded stratum index of a network device may be based on the stratum index of its new synchronization target, and will generally be equal to the stratum index of the new synchronization target plus a non-zero, positive number. In some aspects, the non-zero, positive number may indicate a distance between the network device and its new synchronization target. For example, a network device with a stratum index of 3 that selects a new synchronization target network device with a stratum index of 1, the network device being one hop away from the new synchronization target network device, may be configured to have a new upgraded stratum index of 2. It is noted that in various aspects, the distance may be expressed as an integer, a fraction, or a percentage. In some aspects, the upgrade procedure may also include downstream propagation of the new upgraded stratum index to the children network devices of the network device with the upgraded stratum index. The downstream propagation of the new upgraded stratum index may be similar to the downstream propagation of the artificial stratum index discussed more in depth above. Once the downstream propagation of the new upgraded stratum index has been performed, the process according to the example aspect illustrated by FIG. 6 may stop.

Referring back to block 602, if network device 210*b* does not identify any network devices in the neighbor network devices with a lower stratum index than the stratum index of network device 210*b*, then network device 210*b* may proceed to block 606. At block 606, network device 210*b* may determine whether the downgrade procedure of sync-target selector 360, illustrated at block 628, has been executed. If it is determined that the downgrade procedure has been executed, then operations proceed to block 626, where it is determined that synchronization of network device 210*b* has been lost and that thus, network device 210*b* is unable to establish synchronous operation with other network devices of the network. In some aspects, network device 210*b* may keep track of whether the downgrade procedure has been executed. For example, a flag may be stored in network device 210*b* and used to determine whether the downgrade procedure has been executed. It will be appreciated that, where a network device has lost its synchronization target, and the network device has been unable to find another viable synchronization target network device, then this indicates that there is no available synchronization target network device to which the network device may synchronize its operations. Therefore, at this point, the network device is deemed to have lost synchronization. At this point, the process according to the example aspect illustrated by FIG. 6 may stop.

Referring back to block 606, if network device 210*b* determines that the downgrade procedure has not been executed, then operations may proceed to block 628. At block 628, network device 210*b* may execute the downgrade procedure of sync-target selector 360. In some aspects, the downgrade procedure may include operations as described above with respect to the selection of a new synchronization target for a network device by downgrading the current stratum index of the network device to an artificial stratum index. It will be appreciated that the downgrade procedure may be executed when none of the neighbor network devices available to serve as new synchronization targets for a network device have a stratum index that is lower than the stratum index of the network device.

The downgrade procedure of sync-target selector 360 may include downgrading the stratum index of network device 210*b* to an artificial stratum index by increasing the stratum index by a value D. For example, the stratum index of network device 210*b* may be increased from a value of 2, by a value D=100, to an artificial stratum index of 102. As discussed above, the value D may be based on the maximum allowed tree depth of wireless network 200. As further noted above, the artificial stratum index of network device 210*b* does not accurately indicate the number of hops between network device 210*b* and global synchronization source 250, but rather, the artificial stratum index may be an artificial index that may be used to indicate that network device 210*b* is in the process of reselecting a new synchronization target network device.

The downgrade procedure of sync-target selector 360 may also include downstream propagation of the artificial stratum index to the children network devices of network device 210*b*. For example, the artificial stratum index of network device 210*b* may be propagated downstream to its children network devices 210*d*, 210*e*, and 410-412. The specifics of the downstream propagation of the artificial stratum index have been discussed in depth above. In aspects, once the artificial stratum index has been propagated downstream, network device 210*b* may determine, at block 630, whether the downgrade procedure of the network device was triggered by a loss of the network device's current synchronization target. If it is determined that the downgrade procedure was not triggered by a loss of the current synchronization target, then the process according to the example aspect illustrated by FIG. 6 may stop. For example, in some aspects, as discussed below, the downgrade procedure may be executed as part of a stratum index propagation procedure triggered by a synchronization target obtaining a new, higher, stratum level. This may occur, for example, when the synchronization target itself reselects a new synchronization target. In this instance, the network device may not need to select a synchronization target because the network device did not actually lost its current synchronization target. However, if it is determined that the downgrade procedure was triggered by a loss of the current synchronization target, then network device 210*b*'s operations may proceed to block 632. The operations at block 632 may ensure that network device 210*b*'s, having lost its synchronization target and having been downgraded to an artificial stratum index, is allowed to select a new synchronization target based on the artificial stratum index.

At block 632, network device 210b, may determine whether any of the network device's neighbor network devices available to serve as new synchronization targets has a lower stratum index than network device 210b's artificial stratum index. If network device 210b does not identify any network devices in the neighbor network devices with a lower stratum index than network device 210b's artificial stratum index, then network device 210b proceeds to block 626, where it is determined that synchronization of network device 210b has been lost and that thus, network device 210b is unable to establish synchronous operation with other network devices of the network. It will be appreciated that a network device whose operations are at block 632 has lost its synchronization target, has executed its downgrade procedure, and has been unable to find another viable synchronization target network device. This may indicate that there is no available synchronization target network device to which the network device may synchronize its operations. Therefore, at this point, the network device is deemed to have lost synchronization. At this point, the process according to the example aspect illustrated by FIG. 6 may stop.

Referring back to block 632, if network device 210b identifies a network device in the neighbor network devices with a lower stratum index than network device 210b's artificial stratum index, then network device 210b proceeds to block 620. At block 620, network device 210b selects the neighbor network device identified at block 632 as its new synchronization target and changes its configuration to reflect the change. Network device 210b may then use synchronization signals from its new synchronization target to establish synchronous operation with other network devices of the network. Network device 210b operations then proceed to block 622, where network device 210b executes the upgrade procedure of sync-target selector 360. The upgrade procedure at block 622 has been discussed in more depth above.

Network device 210b's operations may also include the stratum propagation procedure of sync-target selector 360 that may start at block 614 and that may be executed when the current synchronization target of a network device is determined to have been configured with a new stratum index. In some aspects, the new stratum index may be an index that is lower than the previous stratum index of the synchronization target, or may be an index that is higher than the previous stratum index of the synchronization target. Furthermore, a synchronization target may be configured with a new stratum index due to various reasons. For example, a synchronization target may lose its own synchronization target and thus, may reselect a new synchronization target configured with a different stratum index than the previous synchronization target. In some embodiments, a child network device may execute the stratum propagation procedure starting at block 614 in response to its parent network device having executed its own downgrade procedure (e.g., to downgrade the parent network device's stratum index to an artificial stratum index). As noted above, when a parent network device downgrades its stratum index to an artificial stratum index, the parent network device may propagate the artificial stratum index downstream to its children network devices. Children network devices, upon receiving the artificial stratum index of the parent network device, may execute their respective stratum propagation procedures. In other embodiments, a network device executing the stratum propagation procedure may be a child network device of a parent network device that has upgraded its stratum index as a result of selecting a new synchronization target with a higher stratum index. As noted above, when a parent network device upgrades its stratum index, the parent network device may propagate the new upgraded stratum index downstream to its children network devices. Children network devices, upon receiving the new upgraded stratum index of the parent network device, may execute their respective stratum propagation procedures.

As may be appreciated from the foregoing, a network device may determine a synchronization target's stratum index by processing reference signals received from the synchronization target. Based on the stratum index obtained from the reference signal received from the synchronization target, a network device may determine whether the synchronization target's stratum index has changed. If, at block 614, network device 210b determines that its synchronization target's stratum index has changed, execution may proceed to block 616. At block 616, network device 210b may determine whether the synchronization target's stratum index has been upgraded. For example, network device 210b may determine whether the synchronization target's stratum index has been decreased. If network device 210b determines that the synchronization target's stratum index has been upgraded, then network device 210b's operations may proceed to block 622.

At block 622, network device 210b executes the upgrade procedure of sync-target selector 360 to upgrade (e.g., increase) the stratum index of network device 210b, as previously described, based on the new upgraded stratum of its synchronization target. In aspects, the upgraded stratum index of a network device may be equal to the upgraded stratum index of its synchronization target plus a non-zero, positive number. In some aspects, the non-zero, positive number may indicate a distance between the network device and its new synchronization target. For example, if the synchronization target of a network device has been upgraded to a stratum index of 1, then, upon execution of the upgrade procedure, the network device, which may be one hop away from its synchronization target, may be upgraded to a stratum index of 2. If, at block 616, network device 210b determines that the synchronization target's stratum index has not been upgraded, then network device 210b's operations may proceed to block 618. At block 618, network device 210b may determine whether the synchronization target's stratum index has been downgraded. For example, network device 210b may determine whether the synchronization target's stratum index has been increased. If network device 210b determines that the synchronization target's stratum index has been downgraded, then network device 210b's operations may proceed to block 628.

At block 628, network device 210b may execute the downgrade procedure of sync-target selector 360. At block 628, network device 210b may downgrade (e.g., increase) the stratum index of network device 210b, as previously described, based on the new downgraded stratum of its synchronization target. As noted above, generally, the downgraded stratum index of a network device may be equal to the downgraded stratum index of its synchronization target plus a non-zero, positive number. In some aspects, the non-zero, positive number may indicate a distance between the network device and its new synchronization target. For example, if the synchronization target of network device 210b has been downgraded to a stratum index of 4, then, upon execution of the downgrade procedure, network device 210b may be downgraded to a stratum index of 5. If, at block 618, network device 210b determines that the synchronization target's stratum index has not been downgraded, then the process according to the example aspect illustrated by FIG. 6 may stop.

Network device 210b's operations may also include a procedure, starting at block 608, that is executed when a new neighbor network device is discovered. For example, network device 210b may determine, using receiver 320, neighbor cell measurement 340, and/or decision maker 350, that a new neighbor network device is available to serve as a synchronization target for network device 210b. In aspects, network device 210b may discover the presence of a new neighbor network device based on signals, such as reference signals, broadcast from the new neighbor network device. It should be noted that, as discussed above, a network device with a lower stratum index is more desirable than a network device with a higher index. In some aspects, a particular network device may be more desirable because the particular network device may provide a higher signal strength and/or a better signal quality than another network device, as determined by signal measurements. In aspects, a first network device may be more desirable, as a synchronization target for a particular network device, than a second network device because the timing offset between the first network device and the particular network device may be better, or smaller, than the timing offset between the second network device and the particular network device.

It will be appreciated from the foregoing that in aspects, upon discovering, at block 608, that a new neighbor network device is available, network device 210b may determine, at block 610, whether the stratum index of the new neighbor network device is lower than the stratum index of network device 210b's current synchronization target. For example, network device 210b may use receiver 320 and/or neighbor cell measurement 340 to receive and process reference signals received from the new neighbor network device to determine the new neighbor network device's stratum index. In some aspects, at block 610, network device 210b may also determine whether the new neighbor network device has a better signal (e.g., higher strength and/or higher quality) than the current synchronization target. In some aspects, network device 210b may also determine whether the timing offset between then new neighbor network device and network device 210b is better than the timing offset between network device 210b and the current synchronization target. If network device 210b determines that the new neighbor network device has a better signal, or better timing offset, and a lower stratum index, network device 210b's operation proceeds to block 620.

At block 620, network device 210b selects the new neighbor network device as its synchronization target and then proceeds to block 622 and executes the upgrade procedure of sync-target selector 360 to upgrade its stratum index and to propagate the change if necessary, as previously described. If network device 210b determines, at block 610, that the new neighbor network device does not have a lower stratum index than the network device's current synchronization target, network device 210b's operation proceeds to block 612. At block 612, network device 210b determines whether the stratum index of the new neighbor network device is equal to the stratum index of network device 210b's current synchronization target. If network device 210b determines that the new neighbor network device has a better signal, or better timing offset, and a stratum index that is equal to the stratum index of network device 210b's current synchronization target, network device 210b's operation proceeds to block 624. At block 624, network device 210b selects the new neighbor network device as its synchronization target, and changes its configuration to reflect the change, as previously described. However, as the new synchronization target and the previous synchronization target have the same stratum index, network device 210b may not execute its downgrade or upgrade procedure. If, at block 612, network device 210b determines that the new neighbor network device does not have a better signal, or better timing offset, and/or has a stratum index that is not equal to the stratum index of network device 210b's current synchronization target, network device 210b's does not trigger a change of its synchronization target, and the process according to the example aspect illustrated by FIG. 6 may stop.

Figure 7:
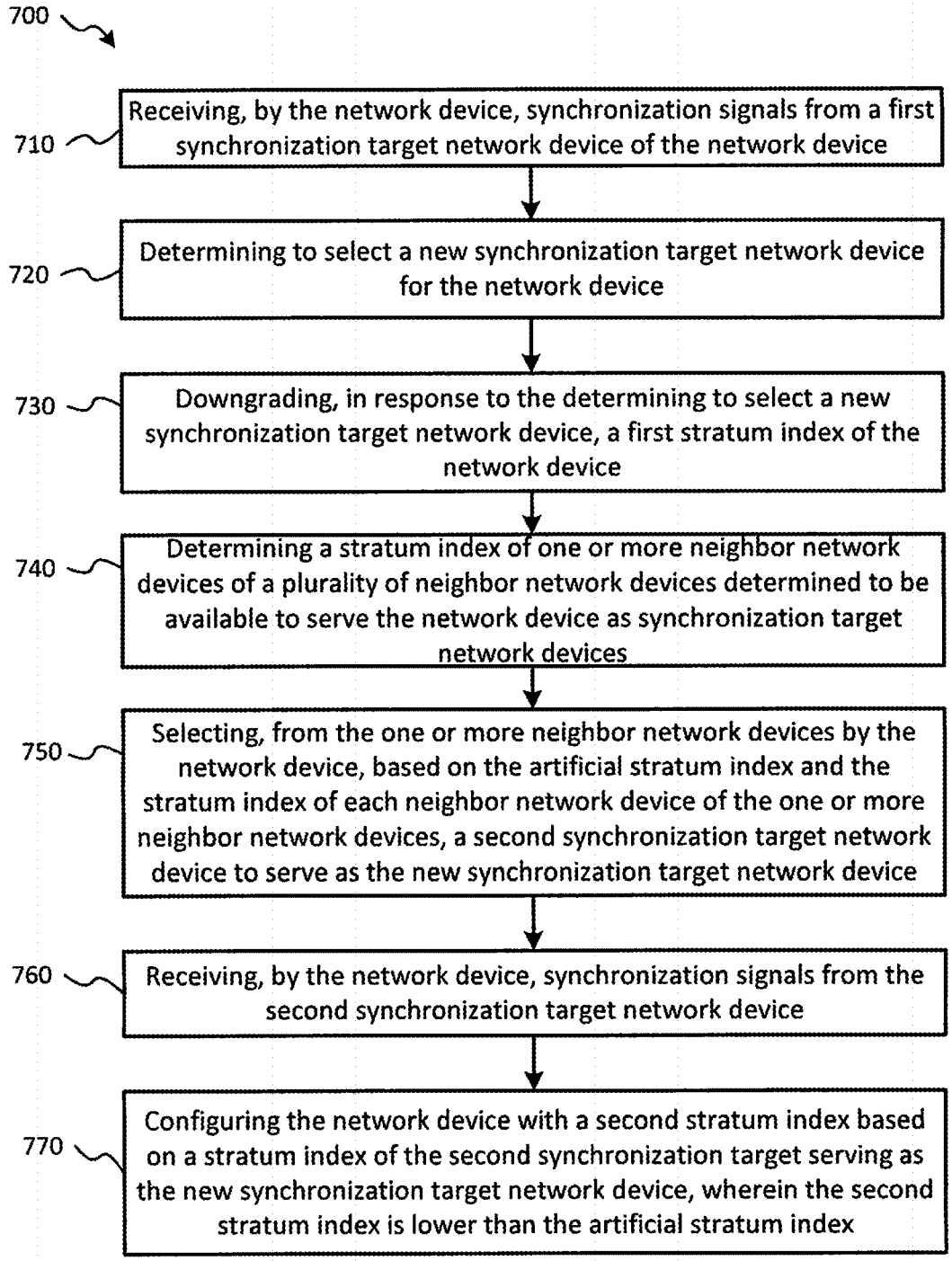
FIG. 7 is another functional block diagram illustrating example blocks executed to implement aspects of the present disclosure.

Having described a broad process that may be used in any network situation for selecting a synchronization target, a specific aspect of the disclosure is now described. FIG. 7 is a functional block diagram illustrating example blocks executed to implement one aspect of the present disclosure shown as method 700. At block 710, a network device may receive synchronization signals from a first synchronization target network device of the network device. In some aspects, the synchronization signals may be received from the first synchronization target network device via a wireless link between the network device and the first synchronization target network device.

At block 720, a determination to select a new synchronization target network device for the network device is made. In some aspects, the determination to select a new synchronization target network device is made by the network device based on the status of the wireless link between the network device and the first synchronization target network device. In some aspects, the network device may determine that the wireless link has failed, or may determine that the network device is unable to receive the synchronization signals from the first synchronization target, based on signal measurements of the wireless link.

At block 730, a first stratum index of the network device is downgraded in response to the determining to select a new synchronization target network device. In aspects, the downgrading of the first stratum index of the network device includes configuring the network device with an artificial stratum index that is higher than the first stratum index. For example, in some aspects, the artificial stratum index may be computed by increasing the first stratum index of the network device by a value D. In some aspects, the value D may be a predetermined value. In some aspects, the value D may be determined based on the maximum tree depth of the wireless network.

In further aspects, the artificial stratum index may be propagated downstream to children network devices of the network device. For example, the network device may broadcast the artificial stratum index to its downstream children network devices. The downstream children network devices may be those that are configured with the downgraded network device as a synchronization target. In aspects, the children network devices may receive the broadcast artificial stratum index from the parent network device (e.g., included in s reference signal broadcast from the parent network device) and may determine that the parent network device has an artificial stratum index. In response to determining that the parent network device has an artificial stratum index, each child network device may downgrade its respective stratum index to an artificial stratum index. In aspects, the downgrading of the respective stratum index of the children network devices may include configuring each child network device with an artificial stratum index that is higher than its respective stratum index. For example, in some aspects, the artificial stratum index of a child network device may be computed by increasing the current stratum index of a child network device by a value D. In some aspects, the value D may be determined based on the maximum tree depth of the wireless network. In aspects, the value D used for downgrading the children network devices may be the same value D used for downgrading the parent network device. In some aspects, the value D may be a predetermined value.

At block 740, a stratum index of one or more neighbor network devices of a plurality of neighbor network devices determined to be available to serve the network device as synchronization target network devices is determined. In some aspects, the neighbor network devices may be determined to be available to serve the network device as synchronization target network devices based on measurements of signals from the neighbor network devices. For example, signal strength and/or signal quality measurements of the signals from the neighbor network devices may be used to determine whether particular network devices are available or unavailable to serve as a synchronization target network device. In further aspects, the stratum index of one or more neighbor network device may be determined based on a reference signal received from the one or more neighbor network devices. For example, a reference signal that includes a stratum index may be generated by the one or more neighbor network devices and broadcast to other network devices. In some aspects, the reference signal of a neighbor network device is modified (e.g., modulated) based on the stratum index of the neighbor network device. When another network device receives the reference signal from the neighbor network device, the other network device may extract the stratum index of the neighbor network device by processing the reference signal. selecting, from the one or more neighbor network devices by the network device, based on the artificial stratum index and the stratum index of each neighbor network device of the one or more neighbor network devices, a second synchronization target network device to serve as the new synchronization target network device At block 750, the network device selects a second synchronization target network device to serve as the new synchronization target network device from the one or more neighbor network devices of the plurality of neighbor network devices based on the artificial stratum index and the stratum index of the one or more neighbor network devices. In some aspects, the network device may select a neighbor network device with a stratum index that is lower than the artificial stratum index of the network device. At block 760, the network receives synchronization signals from the second synchronization target network device, and at block 770, the network device is configured with a second stratum index based on the stratum index of the second synchronization target serving as the new synchronization target network device. In some aspects, the second stratum index of the network device may be lower than the artificial stratum index. In this case, the second stratum index may be determined by upgrading (e.g., decreasing) the artificial stratum index. In aspects, the second stratum index may be a value that is equal to the stratum index of the second synchronization target serving as the new synchronization target network device plus a non-zero, positive number. In some aspects, the non-zero, positive number may indicate a distance between the network device and its new synchronization target.

It should be appreciated that, although exemplary embodiments have been described with reference to wireless networks and/or wireless communications, the concepts herein are not limited to applicability to wireless implementations. Embodiments operable in accordance with the concepts herein may be implemented in any communication system, including wired communication systems, optical communication systems, etc., in which synchronization of network devices is desired.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

Figure 6:
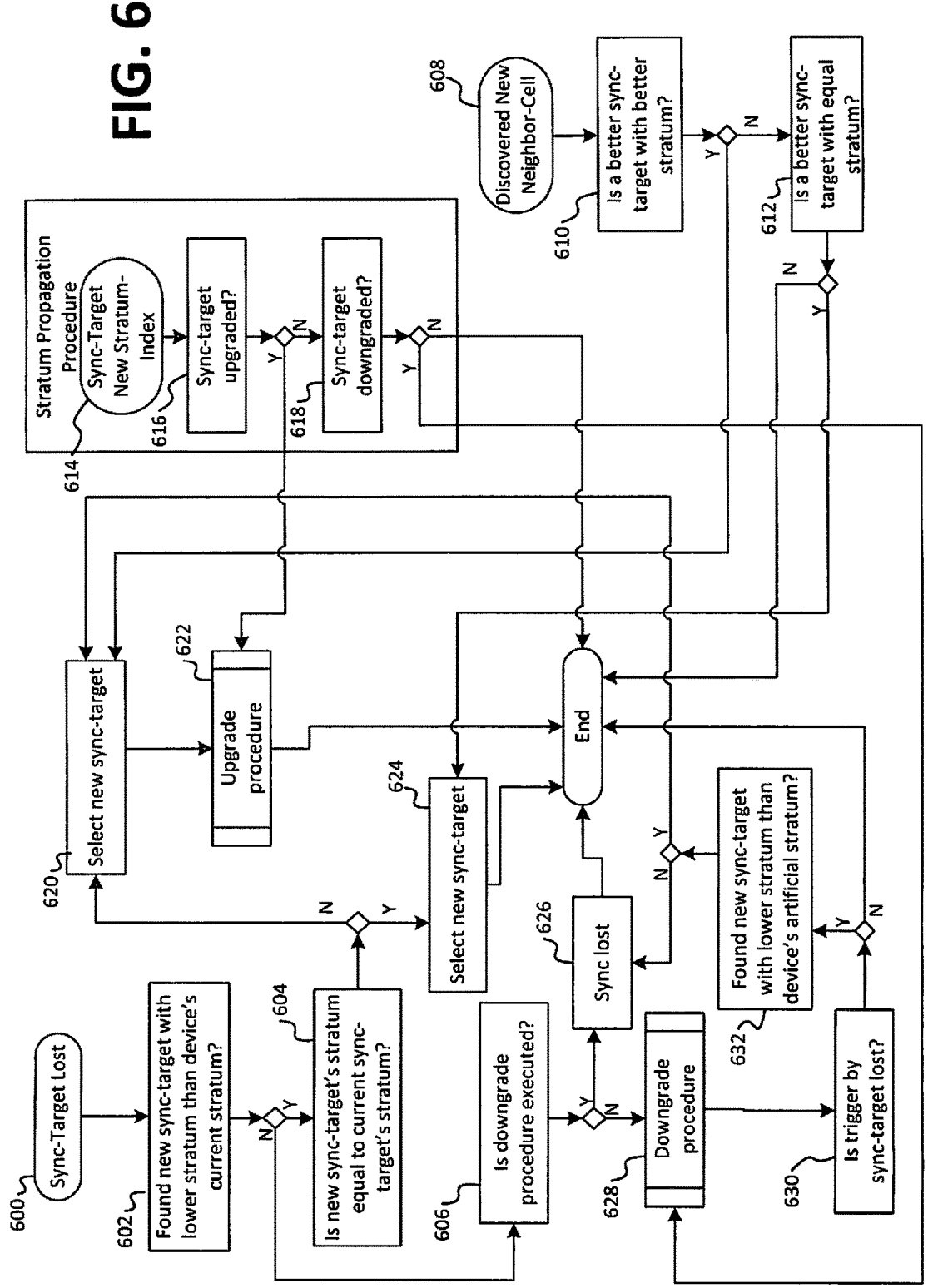
FIG. 6 is a functional block diagram illustrating example blocks executed to implement aspects of the present disclosure.

Functional blocks and modules in FIGS. 3, 6, and 7 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed:

1. A method of selecting a synchronization target for a network device in a wireless network, the method comprising:
   receiving, by the network device, synchronization signals from a first synchronization target network device of the network device;
   determining to select a new synchronization target network device for the network device;
   downgrading, in response to the determining to select a new synchronization target network device, a first stratum index of the network device corresponding to the receiving synchronization signals from the first synchronization target network device, wherein the downgrading includes configuring the network device with an artificial stratum index that is higher than the first stratum index;
   determining a stratum index of one or more neighbor network devices of a plurality of neighbor network devices determined to be available to serve the network device as synchronization target network devices;
   selecting, from the one or more neighbor network devices by the network device, based on the artificial stratum index and the stratum index of each neighbor network device of the one or more neighbor network devices, a second synchronization target network device to serve as the new synchronization target network device;
   receiving, by the network device, synchronization signals from the second synchronization target network device; and
   configuring the network device with a second stratum index based on a stratum index of the second synchronization target network device serving as the new synchronization target network device, wherein the second stratum index is lower than the artificial stratum index.

2. The method of claim 1, wherein the receiving the synchronization signals from the first synchronization target network device is via a wireless link between the network device and the first synchronization target network device, and wherein the determining to select includes determining that the wireless link has failed.

3. The method of claim 1, wherein the one or more neighbor network devices are determined to be available to serve the network device as synchronization target network devices based on measurement of signals received from each network device of the plurality of neighbor network devices.

4. The method of claim 1, wherein the artificial stratum index is computed by increasing the first stratum index of the network device by a predetermined value D.

5. The method of claim 4, wherein the predetermined value D is determined based on a maximum tree depth of the wireless network.

6. The method of claim 5, wherein the predetermined value D is higher than the maximum tree depth of the wireless network.

7. The method of claim 1, wherein the network device broadcasts the artificial stratum index to downstream children network devices, the downstream children network devices being configured with the network device as a respective synchronization target, and wherein each child network device of the downstream children network devices downgrades a respective stratum index to a respective artificial stratum index in response to the broadcast, the respective artificial stratum index being computed by increasing the respective stratum index of each network device by a predetermined value D determined based on a maximum tree depth of the wireless network.

8. The method of claim 1, wherein the determining the stratum index of each neighbor network device includes:
   receiving a reference signal from each neighbor network device, wherein the reference signal from each neighbor network device is transmitted by each neighbor network device in a respective timeslot, the respective timeslot based on the stratum index of a respective neighbor network device;
   detecting, by the network device, a timeslot in which the reference signal from a respective neighbor network device is received; and determining, based on the timeslot, the stratum index of the respective neighbor network device.

9. The method of claim 1, wherein the selecting the new synchronization target network device from the one or more neighbor network devices includes selecting a neighbor network device having a stratum index that is lower than the artificial stratum index of the network device.

10. The method of claim 1, wherein network devices of the wireless network, including the network device, operates in a synchronous mode.

11. An non-transitory computer-readable medium storing instructions that, when executed by one or more processors, cause the one or more processors to perform operations for selecting a synchronization target for a network device in a wireless network, the operations comprising:
   receiving, by the network device, synchronization signals from a first synchronization target network device of the network device;
   determining to select a new synchronization target network device for the network device;
   downgrading, in response to the determining to select a new synchronization target network device, a first stratum index of the network device corresponding to the receiving synchronization signals from the first synchronization target network device, wherein the downgrading includes configuring the network device with an artificial stratum index that is higher than the first stratum index;
   determining a stratum index of one or more neighbor network devices of a plurality of neighbor network devices determined to be available to serve the network device as synchronization target network devices;
   selecting, from the one or more neighbor network devices by the network device, based on the artificial stratum index and the stratum index of each neighbor network device of the one or more neighbor network devices, a second synchronization target network device to serve as the new synchronization target network device;
   receiving, by the network device, synchronization signals from the second synchronization target network device; and
   configuring the network device with a second stratum index based on a stratum index of the second synchronization target network device serving as the new synchronization target network device, wherein the second stratum index is lower than the artificial stratum index.

12. The non-transitory computer-readable medium of claim 11, wherein the receiving the synchronization signals from the first synchronization target network device is via a wireless link between the network device and the first synchronization target network device, and wherein the determining to select includes determining that the wireless link has failed.

13. The non-transitory computer-readable medium of claim 11, wherein the artificial stratum index is computed by increasing the first stratum index of the network device by a predetermined value D, the predetermined value D being determined based on a maximum tree depth of the wireless network.

14. The non-transitory computer-readable medium of claim 11, wherein the network device broadcasts the artificial stratum index to downstream children network devices, the downstream children network devices being configured with the network device as respective synchronization target, and wherein each child network device of the downstream children network devices downgrades a respective stratum index to a respective artificial stratum index in response to the broadcast, the respective artificial stratum index being computed by increasing the respective stratum index of each network device by a predetermined value D determined based on a maximum tree depth of the wireless network.

15. A system configured for selection of a synchronization target for a network device in a wireless network, the system comprising:
   a receiver configured to:
      receive, at the network device, synchronization signals from a first synchronization target network device of the network device via a wireless link between the network device and the first synchronization target network device;
      determine a stratum index of one or more neighbor network devices of a plurality of neighbor network devices of the network device; and
      detect a new neighbor network device in the wireless network;
   a decision making component configured to determine to select a new synchronization target network device for the network device;
   a synchronization target selector configured to, in response to the decision making component determining to select a new synchronization target network device:
      select, from the one or more neighbor network devices, a second synchronization target network device configured with a stratum index lower than a stratum index of the first synchronization target network device to serve as the new synchronization target network device, when at least one network device of the one or more neighbor network devices has a stratum index lower than the stratum index of the first synchronization target network device;
      select, from the one or more neighbor network devices, a second synchronization target network device configured with a stratum index equal to the stratum index of the first synchronization target network device to serve as the new synchronization target network device, when the stratum index of at least one network device of the one or more neighbor network devices is equal to the stratum index of the first synchronization target network device, and when none of the network devices of the one or more neighbor network devices has stratum index lower than the stratum index of the first synchronization target network device; and
      select, from the one or more neighbor network devices, a second synchronization target network device configured with a stratum index higher than or equal to a first stratum index of the network device to serve as the new synchronization target network device, when none of the network devices of the one or more neighbor network devices has stratum index lower than the first stratum index of the network device, wherein selecting the second synchronization target network device configured with a stratum index higher than or equal to the first stratum index of the network device to serve as the new synchronization target network device includes:
         downgrading the first stratum index of the network device, wherein downgrading the first stratum index includes configuring the network device with an artificial stratum index that is higher than the first stratum index;

selecting, from the one or more neighbor network devices based on the artificial stratum index and the stratum index of each neighbor network device of the one or more neighbor network devices, the second synchronization target network device to serve as the new synchronization target network device; and configuring the network device with a second stratum index based on a stratum index of the second synchronization target network device serving as the new synchronization target network device, wherein the second stratum index is lower than the artificial stratum index; and a transmitter configured to transmit reference signals to the plurality of neighbor network devices, wherein at least one reference signal of the reference signals is transmitted in a first timeslot based on the artificial stratum index, and at least one reference signal of the reference signals is transmitted in a second timeslot based on the second stratum index.

16. The system of claim 15, wherein the decision making component determines to select the new synchronization target network device based on at least one of:

a determination that the network device is unable to receive the synchronization signals from the first synchronization target network device via the wireless link;

a determination that a stratum index of the one or more neighbor network devices of the plurality of neighbor network devices has changed; and detection of the new neighbor network device in the wireless network.

17. The system of claim 15, wherein the synchronization target selector is further configured to compute the artificial stratum index by increasing the first stratum index of the network device by a predetermined value D, the predetermined value D being determined based on a maximum tree depth of the wireless network.

18. The system of claim 17, wherein the predetermined value D is higher than the maximum tree depth of the wireless network.

19. The system of claim 15, wherein the configuration of the transmitter to transmit the reference signals to the plurality of neighbor network devices includes configuration of the transmitter to broadcast the artificial stratum index to downstream children network devices, the downstream children network devices being configured with the network device as a respective synchronization target, and wherein each child network device of the downstream children network devices downgrades a respective stratum index to a respective artificial stratum index in response to the broadcast, the respective artificial stratum index being computed by increasing the respective stratum index of each network device by a predetermined value D determined based on a maximum tree depth of the wireless network.

20. The system of claim 15, wherein the selecting the new synchronization target network device from the one or more neighbor network devices includes selecting a neighbor network device having a stratum index that is lower than the artificial stratum index of the network device.

\* \* \* \* \*

UNITED STATES PATENT AND TRADEMARK OFFICE
CERTIFICATE OF CORRECTION

PATENT NO. : 10,212,677 B1
APPLICATION NO. : 15/673105
DATED : February 19, 2019
INVENTOR(S) : Wilson Thong Wang Kit et al.

Page 1 of 1

It is certified that error appears in the above-identified patent and that said Letters Patent is hereby corrected as shown below:

In the Specification

At Column 6, Line number 24, delete "threshold:" and replace with --threshold;--.
At Column 13, Line number 33, delete "210c" and replace with --210e--.
At Column 13, Line number 50, delete "210c" and replace with --210e--.
At Column 16, Line number 54, delete "210d. 210e" and replace with --210d, 210e--.

Signed and Sealed this
Ninth Day of April, 2019

Andrei Iancu
*Director of the United States Patent and Trademark Office*